(12) United States Patent
Banks et al.

(10) Patent No.: US 8,145,327 B2
(45) Date of Patent: Mar. 27, 2012

(54) METHOD AND APPARATUS FOR IMPLEMENTING A CONSUMER-CONFIGURABLE MODULAR ELECTRICAL SYSTEM

(76) Inventors: Susan Banks, Durham, NC (US); Scott D. Elliott, Holly Springs, NC (US); Brad Forrest, Cary, NC (US)

( * ) Notice: Subject to any disclaimer, the term of this patent is extended or adjusted under 35 U.S.C. 154(b) by 358 days.

(21) Appl. No.: 12/403,946

(22) Filed: Mar. 13, 2009

(65) Prior Publication Data

US 2010/0235009 A1    Sep. 16, 2010

(51) Int. Cl.
G06F 1/28    (2006.01)
G06F 19/00   (2011.01)

(52) U.S. Cl. .................. 700/19; 700/20; 700/295
(58) Field of Classification Search .............. 700/9, 19, 700/20, 295, 297; 709/200, 223
See application file for complete search history.

(56) References Cited

U.S. PATENT DOCUMENTS

| | | | |
|---|---|---|---|
| 4,740,866 A | 4/1988 | Kajiwara et al. | |
| 5,066,939 A | 11/1991 | Mansfield, Jr. | |
| 5,203,711 A | 4/1993 | Bogiel | |
| 5,271,582 A | 12/1993 | Perkins et al. | |
| 5,289,365 A * | 2/1994 | Caldwell et al. | 700/9 |
| 5,530,435 A | 6/1996 | Toms et al. | |
| 5,727,963 A | 3/1998 | LeMaster | |
| 5,929,618 A | 7/1999 | Boylan et al. | |
| 5,957,564 A * | 9/1999 | Bruce et al. | 362/84 |
| 6,100,665 A | 8/2000 | Alderman | |
| RE37,592 E | 3/2002 | Alden et al. | |
| 6,866,394 B1 | 3/2005 | Hutchins et al. | |
| 6,994,448 B1 | 2/2006 | Gorrell | |
| 7,043,543 B2 * | 5/2006 | Ewing et al. | 709/223 |
| 7,171,461 B2 * | 1/2007 | Ewing et al. | 709/223 |
| 7,697,268 B2 * | 4/2010 | Johnson et al. | 361/643 |
| 7,702,771 B2 * | 4/2010 | Ewing et al. | 709/223 |
| 7,733,069 B2 * | 6/2010 | Toyomura et al. | 323/256 |
| 7,841,878 B2 * | 11/2010 | Johnson et al. | 439/215 |
| 2002/0002593 A1 * | 1/2002 | Ewing et al. | 709/212 |
| 2002/0101197 A1 | 8/2002 | Lys et al. | |
| 2003/0037813 A1 | 2/2003 | Jansen | |
| 2005/0161079 A1 | 7/2005 | Gray | |
| 2005/0162014 A1 * | 7/2005 | Morizaki et al. | 307/10.1 |
| 2005/0185398 A1 | 8/2005 | Scannell, Jr. | |
| 2005/0203987 A1 * | 9/2005 | Ewing et al. | 709/200 |
| 2005/0223090 A1 * | 10/2005 | Ewing et al. | 709/223 |

(Continued)

FOREIGN PATENT DOCUMENTS

WO    WO 2007007430 A1 *    1/2007

*Primary Examiner* — Charles Kasenge
(74) *Attorney, Agent, or Firm* — Murphy, Bilak & Homiller, PLLC

(57) ABSTRACT

A system of electrical modules includes a plurality of modules, including power modules, control modules, and output modules. Power modules provide power for powering one or more control and output modules. Control modules provide control signals to one or more output modules. Output modules perform predefined functions responsive to receiving power from a power module and/or a control signal from a control module. All of the modules have like mating connectors and like connector wiring. This arrangement forms a system bus across any given plurality of modules, when those modules are serially interconnected in a daisy chain. In at least one embodiment, the mating connectors and the connector wiring are standardized across the system such that any module can be coupled to any other module, and the ordering of the modules in the daisy chain is not fixed.

18 Claims, 23 Drawing Sheets

U.S. PATENT DOCUMENTS

| | | | |
|---|---|---|---|
| 2005/0250545 A1 | 11/2005 | Parker et al. | |
| 2006/0031453 A1* | 2/2006 | Ewing et al. | 709/223 |
| 2006/0053324 A1* | 3/2006 | Giat et al. | 713/300 |
| 2006/0087800 A1* | 4/2006 | Savage | 361/601 |
| 2006/0197474 A1* | 9/2006 | Olsen | 315/312 |
| 2006/0259538 A1* | 11/2006 | Ewing et al. | 709/200 |
| 2007/0050443 A1* | 3/2007 | Ewing et al. | 709/200 |
| 2007/0076340 A1* | 4/2007 | Ewing et al. | 361/62 |
| 2007/0130243 A1* | 6/2007 | Ewing et al. | 709/200 |
| 2007/0136453 A1* | 6/2007 | Ewing et al. | 709/223 |
| 2007/0140238 A1* | 6/2007 | Ewing et al. | 370/389 |
| 2007/0145915 A1 | 6/2007 | Roberge et al. | |
| 2008/0094005 A1 | 4/2008 | Rabiner et al. | |
| 2008/0113567 A1 | 5/2008 | Buller et al. | |
| 2008/0137332 A1* | 6/2008 | Lo et al. | 362/240 |
| 2008/0160804 A1 | 7/2008 | Daily et al. | |
| 2009/0051505 A1* | 2/2009 | Yamamoto et al. | 340/310.11 |
| 2009/0209136 A1* | 8/2009 | Yamamoto et al. | 439/638 |
| 2010/0223480 A1* | 9/2010 | Fratti et al. | 713/300 |

* cited by examiner

MODULE 12, 14, OR 16 (OR COMBO)

METHOD AND APPARATUS FOR IMPLEMENTING A CONSUMER-CONFIGURABLE MODULAR ELECTRICAL SYSTEM

TECHNICAL FIELD

The present invention generally relates to consumer electronics, and particularly relates to a modular system that uses common wiring and connections between power, control, and output modules, thereby allowing consumers to construct a daisy-chained modular system according to desired functions, such as outdoor lighting, landscaping enhancement, and varied other functions.

BACKGROUND

Residences often include multiple electrical devices or systems individually targeted to security, convenience, or beautification functions. Examples include outdoor lighting and associated controls. Associated lighting controls include, for example, motion-based security lighting controls, dusk-to-dawn lighting controls, and manually-switched lighting controls for various landscape lighting features. Other commonly deployed outdoor systems include bubblers and/or pump motors, for powering and controlling various water features, such as fountains, ponds, waterfalls, sprinklers, etc.

Of course, it is also common to plug various kinds of powered accessories into exterior AC receptacles (mains power receptacles) on a temporary or even semi-permanent basis. One might plug in a boom box or other music player, for temporary outdoor enjoyment of music, or might plug in an outdoor floodlight or irrigation control system on a more permanent basis.

Characteristically, these various "systems" are implemented separately, each using its own proprietary interconnections, power supplies, switching elements, control boxes, etc. Correspondingly, the average homeowner must purchase, configure, install, and maintain multiple different systems to support the various features and controls desired. Separate implementations and the general lack of interoperability lead to undesired expense, complexity, and inconvenience.

SUMMARY

According to the teachings herein, a system of electrical modules includes one or more types of power modules, one or more types of output modules, and one or more types of control modules. Advantageously, power, control, and output modules all use like mating connectors and connector wiring, allowing a consumer to interconnect a desired mix and number of modules according to the consumer's desired functionality. With like mating connectors and connector wiring, interconnecting various modules serially in a daisy chain configuration forms a system bus that runs through the module chain and provides for a desired distribution of power and control signals between or among the interconnected modules.

In a preferred embodiment, the types of power modules available include a solar power module, which in one or more embodiments includes a photovoltaic cell, battery, and charging control circuit. The interconnection compatibility between power, control, and output modules allows a user to power multiple types of control and output modules using the same solar power module, or using such number as needed to satisfy the electrical load requirements of the particular numbers and types of control and output modules the user has selected to form the system. As a further advantage of the common system bus wiring and universal connection compatibility, the user can interconnect a given mix of modules in an essentially arbitrary order.

Of course, other types of power modules are manufactured for use in the contemplated system, including converter power modules that produce DC power from AC main power, wind power modules, etc. Likewise, various types of control modules are contemplated, including timer modules that assert control signals according to configurable timers, programmable modules that assert control signals according to user-configured settings, etc. These control signals are carried within the system bus, for controlling output modules included within the given system of modules. For example, various types of output modules are contemplated, including light modules, fountain pump modules, audio modules (radio, MP3), etc. The control signals provide, for example, selective on/off or enablement control for the included output modules.

In one embodiment, a system as proposed in this document includes at least one power module and at least one output module. As a non-limiting example, a given system includes a solar power module and a light output module interconnected together, such that the system bus conducts solar-derived electrical power into the light output module. Optionally, the given system includes a control module, e.g., a timer control or motion sensing control module that selectively switches power to the light output module according to a desired control function.

This document also discloses producing various types of power modules, various types of control modules, and various types of output modules, thereby allowing a consumer to select the types and numbers of power, control, and output modules needed to perform a desired range of functions. Broadly, power modules provide power for powering one or more output modules and control modules. A given output module may be configured to turn on or otherwise perform its output function whenever power from a power module is available on the system bus. Alternatively, a given output module may be configured to operate responsive to a switched power signal that is energized on a selective basis by one or more control modules, according to their configured control functions.

However, the present invention is not limited to the above summary of features and advantages. Indeed, those skilled in the art will recognize additional features and advantages upon reading the following detailed description, and upon viewing the accompanying drawings.

DETAILED DESCRIPTION

This document discloses a system of modules that are interconnected together in a daisy chain. The chain includes a desired number and type of output modules, to perform selected functions, such as lighting, one or more types of optional control modules, to control one or more of the output modules, and one or more types of power modules, to provide power to the output and control modules. A module manufacturer provides various types of power, control, and output modules, and consumers purchase and interconnect the types and numbers of modules corresponding to desired functionality. Of course, the modularity provides for easy addition, removal, or substitution of modules, to tailor the overall mix of functions provided by a given system 10 of series-connected modules.

Figure 1:
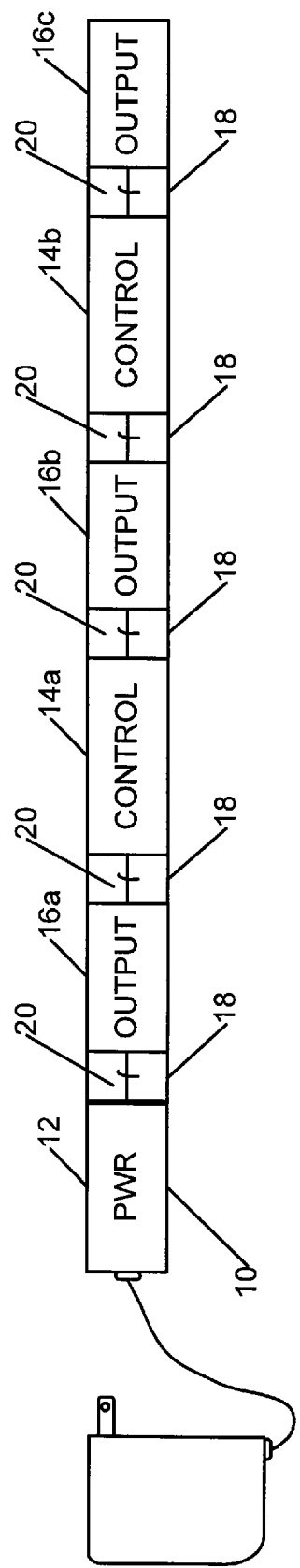
FIG. 1 is a block diagram illustrating an example of a system of electrical modules configured for powering and controlling various output modules.

In the example illustration of FIG. 1, the system 10 includes one or more power modules 12, one or more control modules 14, and one or more output modules 16. As their name implies, power modules 12 provide output power for powering control and output modules 14 and 16. While various types of power modules 12 are contemplated, at least one embodiment of the system 10 includes solar power modules 12, preferably integrating a photovoltaic panel with voltage regulation circuitry, to provide solar-derived power to other modules in the system 10. At least one type of solar power module 12 further includes charging circuitry and a battery.

Control modules 14 perform a designated control function, in dependence on the particular type of control module at issue, and output modules 16 provide specific output functions, e.g., lights, pump motors, etc., and may operate responsive to a given control module 14, or may be "always-on," in which case they operate from the continuous power provided by one or more power modules 12.

At least one configuration of an output module 16 includes a switch or other user-settable element that controls whether the output module 16 operates from continuous power, as supplied by one or more power modules 12, or operates responsive to a control signal from a control module 14. In the latter case, the user-settable element may be configured to choose which one of two or more available control signal lines is used to control the output module 16.

Figure 2:
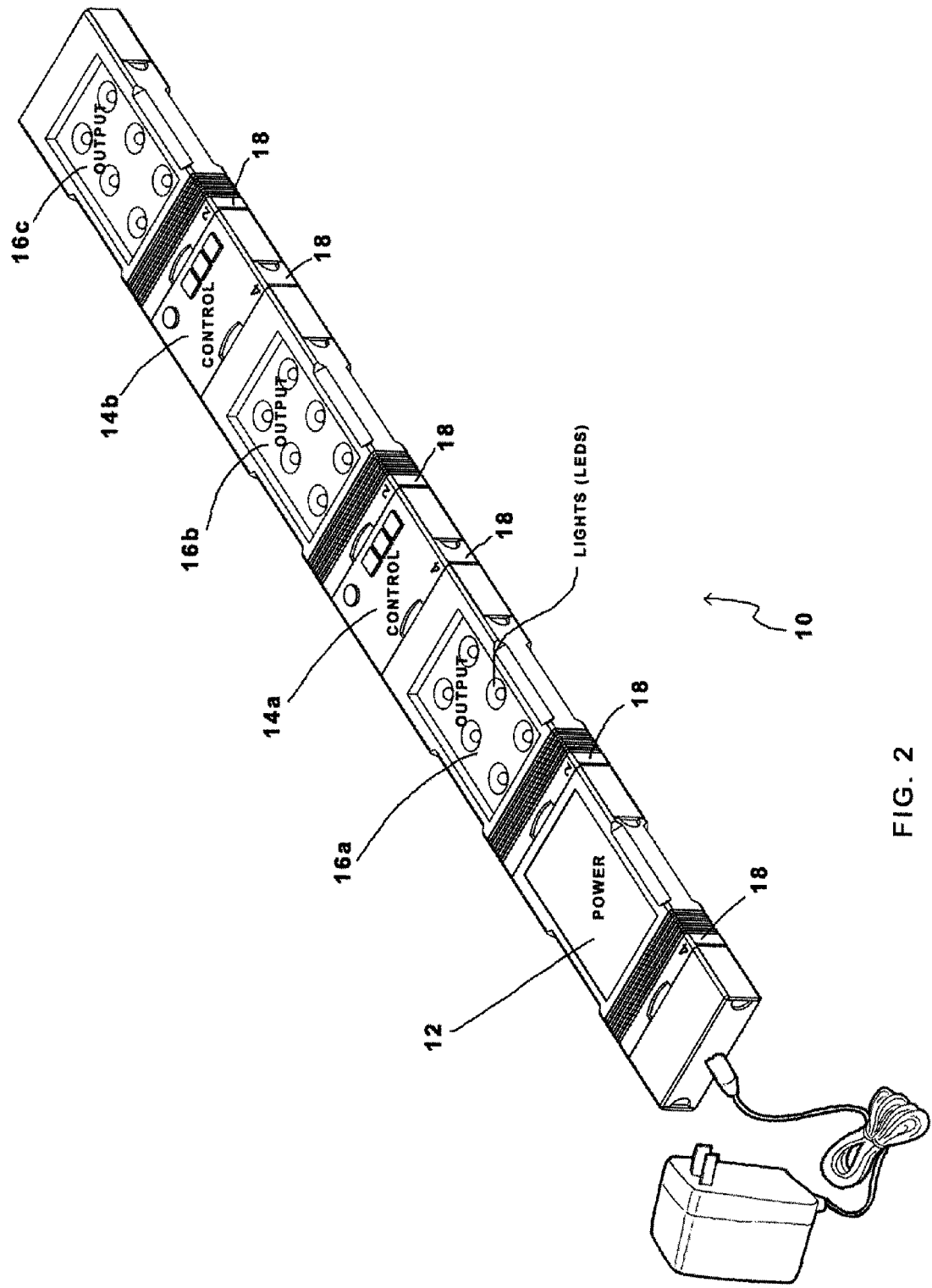
FIG. 2 is a perspective view of the example system of FIG. 1.

Thus, any one or more of the three output modules 16a, 16b, and 16c illustrated in the example system 10 of FIG. 1 may be configured to operate whenever energized by an interconnected power module 12, or may be configured to operate responsive to a control signal from one of the two illustrated control modules 14a or 14b. Such configurations may be fixed, as a factory pre-set configuration, or the configuration may be user settable, such as through use of the above-described switch or other user-settable element. In any case, the example system 10 includes one power module 12 powering the two control modules 14a and 14b, and three output modules 16a, 16b, and 16c. This same arrangement is further illustrated in the perspective view of system 10, as provided in FIG. 2.

Advantageously, the different types of modules are interconnectable, because all modules use like male/female connectors 18 and associated connector wiring, such that serially interconnecting two or more modules together defines a system bus 20 that extends across/through the interconnected modules. As will be explained, the system bus 20 carries power, ground, and, in at least some embodiments, control signal connections for a chain of interconnected modules. This arrangement directly enables a user, e.g., a consumer who has purchased desired numbers and types of modules, to form the system 10 according to the particularly desired mix of module types and module numbers.

In more detail, the system bus 20 distributes like connector wiring in and through each module used to form the system 10 and maintains compatibility and control across interconnected modules. This arrangement allows different types of electrical modules to be distributed anywhere within the daisy chain. For example, although only one power module 12 is shown in FIG. 1, another embodiment of system 10 includes multiple power modules 12, which can be distributed throughout a daisy chain of interconnected modules.

The system 10 thus provides a simple method for users to fashion a system 10 that provides a potentially complex mix of lighting, fountain control, and various other outdoor-related functions. Of course, while the use of compatible connectors and wiring across the different module types allows essentially arbitrary ordering of modules in a daisy chain of interconnected modules, a minimum useful implementation of the system 10 generally will include at least one power module 12 and at least one output module 16.

Figure 3:
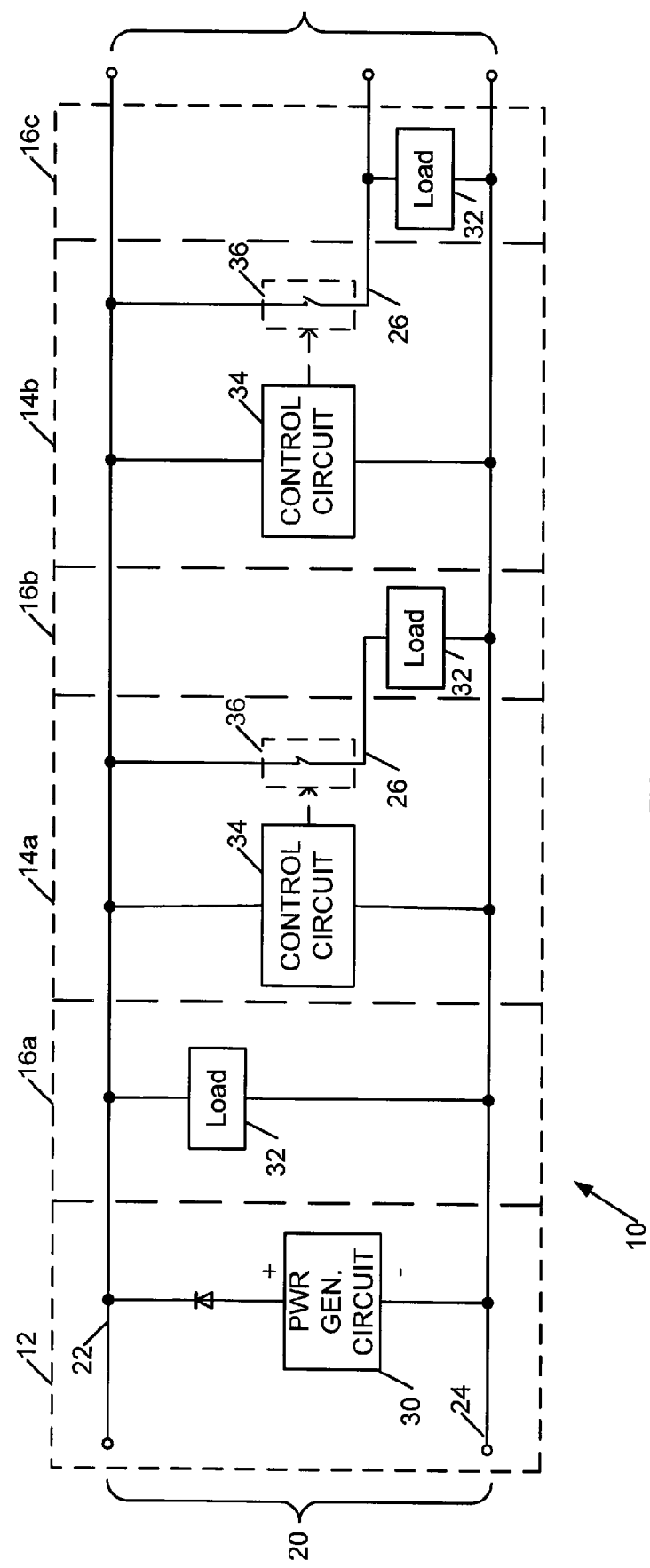
FIG. 3 is a schematic diagram of one embodiment of a modular electrical system, illustrating an example of a system bus having one switched power line.

By way of non-limiting example, FIG. 3 provides a more detailed depiction of the system 10 in one or more embodiments. One sees that the system bus 20 includes a continuous power signal line 22, a ground line 24, and a switched power signal line 26. As a general proposition, power modules 12 provide output power to the continuous power signal line 22, for providing a continuous power source to the various control modules 14 and output modules 16 that are interconnected together to form the system 10. Further, the "control signal" output by a given control module 14 in the system 10 is, in one or more embodiments, a switched version of the continuous power signal. The switched signal in control module 14 provides ON/OFF control to any output modules 16 that are powered by that switched power signal.

Continuing with the description, one sees that the depicted power module 12 includes a power generation circuit 30, which is coupled between the continuous power signal line 22 and the ground signal line 24—the input power source for the power generation circuit 30 is not shown for simplicity. In at least one embodiment, each power module 12 provides output power as a DC voltage, which may be regulated to a desired voltage level, e.g., 12 VDC. While not required, each power module 12 can include a series diode or other reverse polarity protection circuitry on its power output, to allow parallel interconnection of multiple power modules 12. This arrangement allows any one or more of the power modules 12 in a given system 10 to source current into the continuous power signal line 22, while preventing any given power module 12 from sinking current from that line.

Further, a first output module 16*a* (going left to right in the diagram) includes a load 32 that is powered by the continuous power signal. Thus, at least one type of output module 16 is configured for always-on operation, or at least is configured to operate any time the continuous power signal line 22 is energized by an attached power module 12. The load 32 comprises, for example, a pump motor, sprinkler controller, decorative or security light, radio, CD player, MP3 player or other music system, cell phone charger, etc., in dependence on the particular configuration of the output module 16*a*. Those skilled in the art will appreciate that a user selects the particular types of output modules 16 to include in a given system implementation, based on intended use and required functionality.

It is contemplated herein that many different types of output modules 16 will be offered to consumers, thereby allowing a given consumer to configure a system 10 according to the needs or desires of that particular consumer. As non-limiting examples, one or more of the following types of output modules 16 will be offered:

lighting modules, including one or more of decorative lighting modules, flood, spot, or other functional lighting modules, security-related lighting, such as motion- and/or sound-activated lights, and LED or incandescent string lights, including blinking and non-blinking varieties;

electrical power output modules that provide power (e.g., DC power) for external devices plugged into them, including modules with USB charging ports, 12 VDC or other DC voltage ports using standardized DC power connections common to cell phones, digital cameras, MP3 players, etc.;

DC motor modules;

fan modules, including modules having decorative features animated by fan rotation;

water pump, sprinkler, bubbler, or other submersible, water feature modules for decorative or irrigation water control;

animal and/or insect repellent modules, including one or more of audio-based, chemical scent- or dispersant-based repellent modules, such as citronella warmers and mosquito sprayers, bug zappers, etc.;

audio or video players and/or recorders, including MP3 or other digital music players, and audio and/or video recorders for entertainment or security purposes, such as motion- and/or sound-activated audio/video recorders; and communication modules, such as radiofrequency wireless modules, that transmit data from included or associated audio/video monitoring circuits, and/or transmit status or other monitoring signals for themselves or other modules in the system 10.

From the above example listings, those skilled in the art will appreciate that a consumer assembles a system 10 with a desired mix of functionality, based on choosing the appropriate types of modules and interconnecting them. One may mix fanciful decorative functions with practical functions, such as irrigation and/or security monitoring. Further, one may easily reconfigure a given system 10, simply by adding, removing, or swapping out modules.

Returning to the diagram, next in line within the daisy chain, one sees a first control module 14*a*, which includes a control circuit 34 that is powered by the continuous power signal line 22. The control module 14*a* further includes a switching circuit 36, which may comprise an electromechanical relay or a solid-state relay, for example, that selectively switches power on and off to the switched power signal line 26 of the system bus 20. More particularly, the control circuit 34 is configured to carry out a control function that determines whether the switching circuit 36 electrically couples the switched power signal line 26 to continuous power signal line 22, or uncouples it. As a non-limiting example, the control circuit 34 comprises a configurable timer that flips the switching circuit 36 from off to on at programmed times, or it comprises a motion sensor—e.g., an IR-based motion sensor circuit—that performs off/on switching responsive to detecting motion.

Still further, one sees that the next output module 16 in the daisy chain is denoted as output module 16*b*. In contrast to the output module 16*a*, which was powered from the continuous power signal line 22, the output module 16*b* is configured to be powered from the switched power signal line 26, as output by the preceding control module 14*a*. Because the particular wires and connector terminals used to carry these signals are standardized and preset across the various module types, an output module 16 can be configured at the time of manufacture to use continuous power or to use switched (controlled) power, or can be made so that the selection of continuous or switched power is user-selectable. These various options can be indicated on packaging or user materials included with the sale of output modules 16, and can be used, for example, to establish different pricing points.

As another note, those skilled in the art should appreciate that the load 32 in the module 16*b* may or may not be the same type of load 32 as included in the module 16*a*—the common use of the reference designator 32 for all loads is done for convenience of notation and discussion. For example, the load 32 in output module 16*a* may be a water pump motor where continuous running is desirable, such as for decorative pond water circulation, while the load 32 in output module 16*b* may comprise a landscaping light used for nighttime illumination, in which case, the control module 14*a* comprises a photosensor-based control module that energizes the switched power signal line 26 responsive to detecting low ambient light.

Still moving rightward in the diagram, one next sees another control module 14, denoted as 14*b*. The control module 14*b* includes a control circuit 34 and a switching circuit 36. Again, it should be understood that the control circuit 34 and/or the switching circuit 36 in the control module 14*b* may or may not be implemented the same as those in the control module 14*a*. Indeed, as a point of system flexibility, a user may choose several different types of control modules 14 for inclusion in the daisy chain, each having its own type of control (photosensor, timer, temperature detection, motion detection, sound detection, etc., or combinations of different control types, e.g., motion plus timer or motion plus sound).

Also noteworthy, one sees that the switched power signal line 26 on the left side of the control module 14*b* is controlled by the preceding control module 14*a*, while it is controlled by the control module 14*b* on the right side of the control module 14. As such, switched-power output modules 16 that are positioned in the daisy chain after the control module 14*a* but before the control module 14*b* operate under control of the control module 14*a*. Switched-power output modules 16 that are positioned after the control module 14*b* are controlled by the control module 14*b*, and not by the control module 14*a*.

This "override" functionality is accomplished by the control module 14*b* generating its own version of the switched power signal line 26, based on carrying out its own control function, rather than passing through the switched power signal line 26 incoming to the control module 14*b*, which is passed through the output module 16*b* from the preceding control module 14*a*. Other embodiments of the control modules 14 and the system bus 20 are contemplated herein which use more than one switched power signal line, and wherein control modules 14 pass through those switched power signal lines they are not configured to control.

Figure 4:
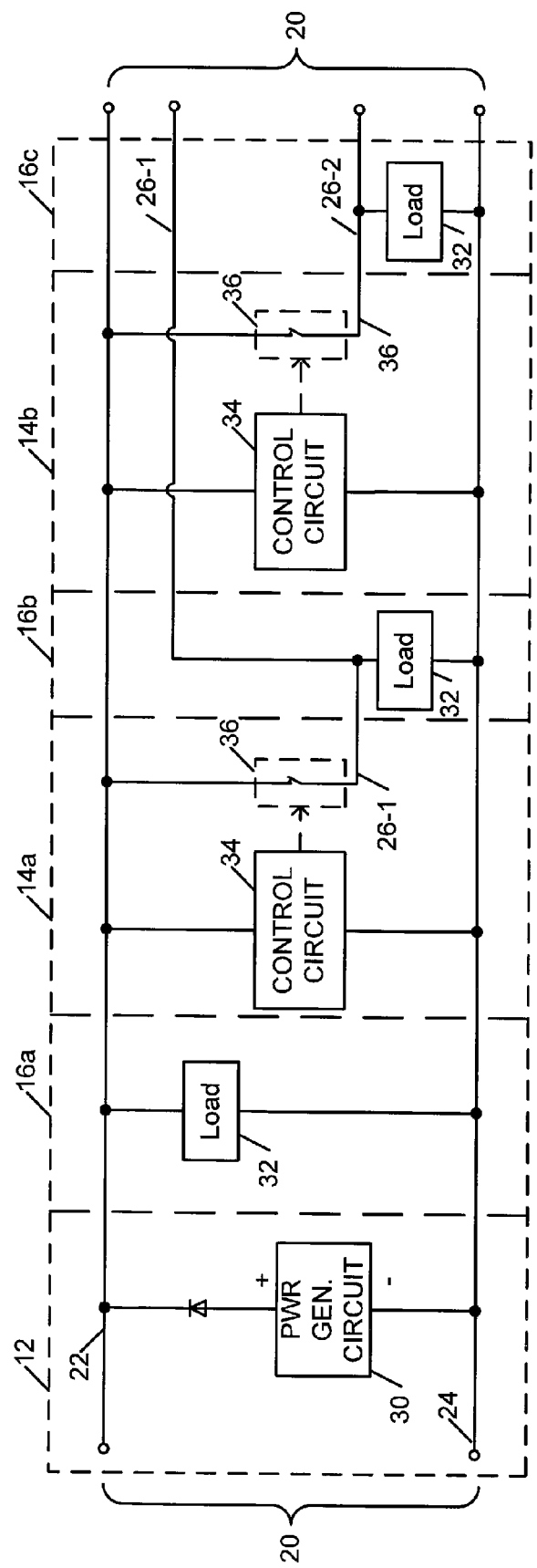
FIG. 4 is a schematic diagram of another embodiment of a modular electrical system, wherein the system bus includes first and second switched power lines.

In this manner, switched power can pass through control modules 14, meaning that a given control module 14 may control a given output module 16 even where there is an intervening control module 14 within the daisy chain. FIG. 4 depicts such an embodiment, wherein the system bus 20 includes two switched power signal lines 26, denoted as 26-1 and 26-2. One sees that the first control module 14*a* in the depicted daisy chain controls whether the switched power signal line 26-1 is energized or de-energized. The second control module 14*b* controls switched power signal line 26-2, and additionally passes through the switched power signal line 26-1. With this arrangement, an output module 16 that is rightward or "downstream" in the daisy chain from both control modules 14*a* and 14*b* can be configured to operate from either one of the switched power signal lines 26-1 or 26-2. Therefore, in at least one embodiment, at least some output modules 16 are manufactured with DIP switches or other user-accessible configuration switches, jumpers, or the like, to control whether the output module 16 operates from a particular one of the switched power signal lines 26-1 or 26-2, or from the continuous power signal line 22.

Figure 5:
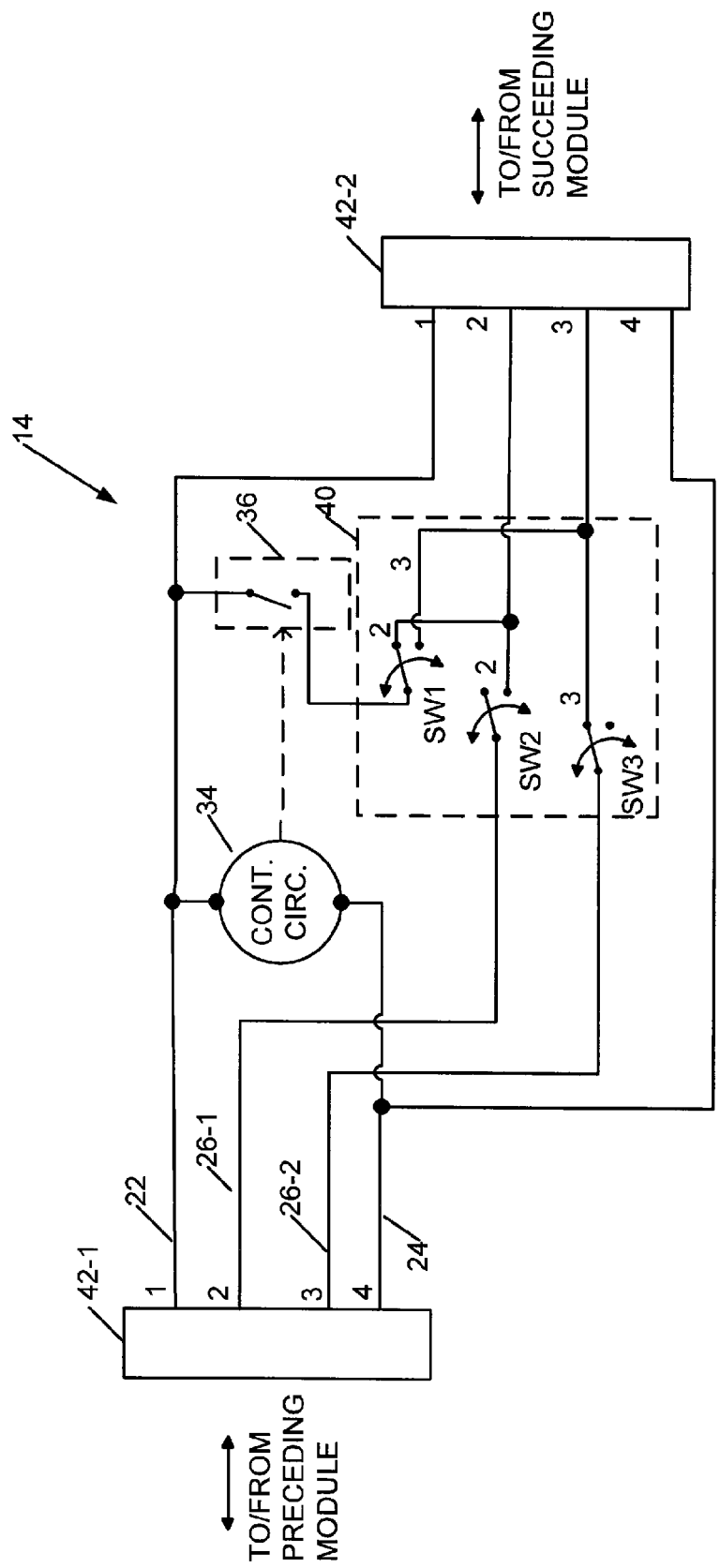
FIG. 5 is a schematic diagram illustrating an example of switching circuitry included within an embodiment of a control module for use with system buses that provide two switched power lines.

FIG. 5 provides non-limiting switch details for one embodiment of a control module 14 that is specially configured to work with system buses 20 that include two switched power signal lines 26-1 and 26-2. In addition to including the previously described control circuit 34 and switching circuit 36, the control module 14 includes a user-settable configuration switch 40, which may be implemented as set of ganged DPDT switches (denoted as SW1, SW2, and SW3), that allow the user to configure the control module 14 to pass through one of the switched power signal lines 26-1 and 26-2 from a male (or female) terminal 42-1 at one end of the control module 14 to the corresponding female (or male) terminal 42-2 at the other end of the control module 14. The other one of the switched power signal lines 26-1 and 26-2 is not passed through, but rather is locally generated/controlled by the control module 14. Similar switching is included in at least one type of output module 16, for determining which power line—22, 26-1, 26-2, etc.—in the system bus 20 is to provide operating power to the output module 16.

It should be noted that each module (power 12, control 14, and output 16) generally includes a like pair of male/female connectors 42-1 and 42-2, although not all system bus signal lines necessarily are wired in all such terminals 42. For example, returning to the context of FIG. 3 for a moment, a connector 42 (not shown in FIG. 3) on the left-hand side of control module 14*b* terminates the incoming switched power signal line 26 in an open connection, while a right-hand side connector 42 (not shown in FIG. 3) provides the locally-controlled version of the switched power signal line 26.

Broadly, however, the male/female connectors 42 of each module include corresponding connector terminals that electrically interconnect via module wiring, such that at least some of the system bus lines are passed through the module. As a general proposition, the continuous power and ground signal lines 22 and 24 are passed through each module. With such an arrangement, the female connector 42-1 (or 42-2) of one module can be plugged into the male connector 42-2 (or 42-1) of an adjacent module, and that inter-plugging can be repeated to form the system 10 as a daisy chain of interconnected modules having an essentially arbitrary module ordering and mix of module types.

Figure 6:
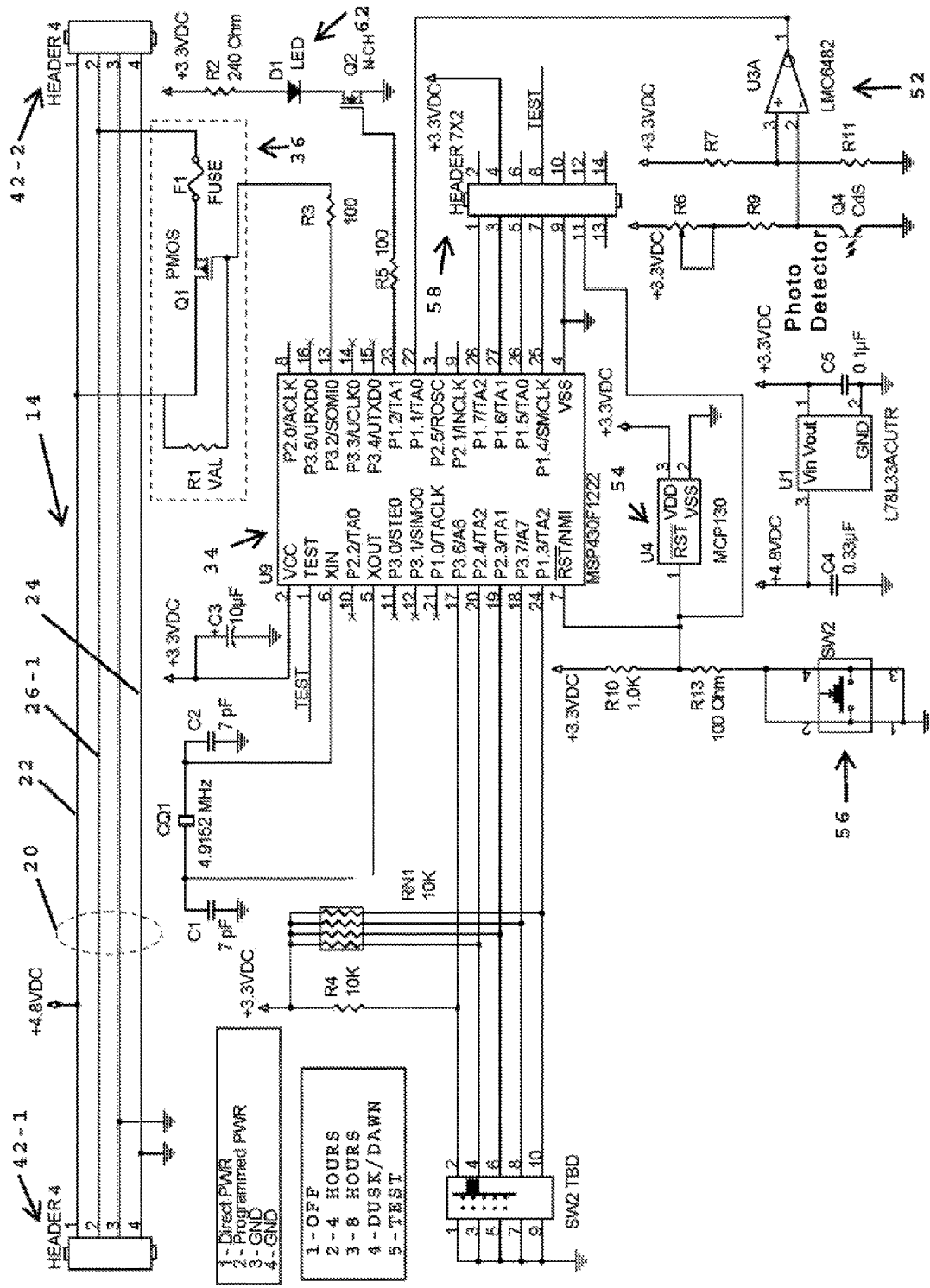
FIG. 6 is a schematic diagram illustrating an example of circuitry included within one embodiment of a programmable control module.

Turning to another non-limiting circuit example, FIG. 6 depicts an embodiment of a control module 14, wherein the control circuit 34 is implemented as a programmed microprocessor, e.g., a mixed-signal MSP430F Series microcontroller from TEXAS INSTRUMENTS, including program memory containing stored program instructions. A time-setting switch circuit 50 allows a user to set a programmable control interval via one or more switches, which may be DIP switches for example. The microcontroller outputs a signal line to the switching circuit 36, to energize and de-energize switched power signal line 26-1, within the system bus 20. Here, the switching circuit 36 is implemented using a MOSFET pass transistor (Q7), along with supporting fusing, etc.

Circuitry further includes a photosensing circuit 52, which, if populated, allows the microcontroller to perform both timer-based control and photosensor-based control of the switched power signal line 26-1. Also advantageous from a manufacturing convenience and cost perspective, either the time-setting switch circuit 50 or the photosensing circuit 52 can be implemented on the control module's circuit board, and a microcontroller programmed either for timer-based or photosensor-based control can be installed.

Additional circuitry that may be implemented includes a power-on reset circuit 54, a push-button reset circuit 56, a test header/circuit 58, a local voltage regulator 60, and a visible indicator circuit 62. The local voltage regulator 60 provides a regulated operating voltage, e.g., 3.3 VDC or lower, for operating the microcontroller, which preferably is a low-power/low-voltage device. The visible indicator circuit 60 can be used to convey go/no-go status to a system user, and to indicate control state, activity, etc.

Figure 7:
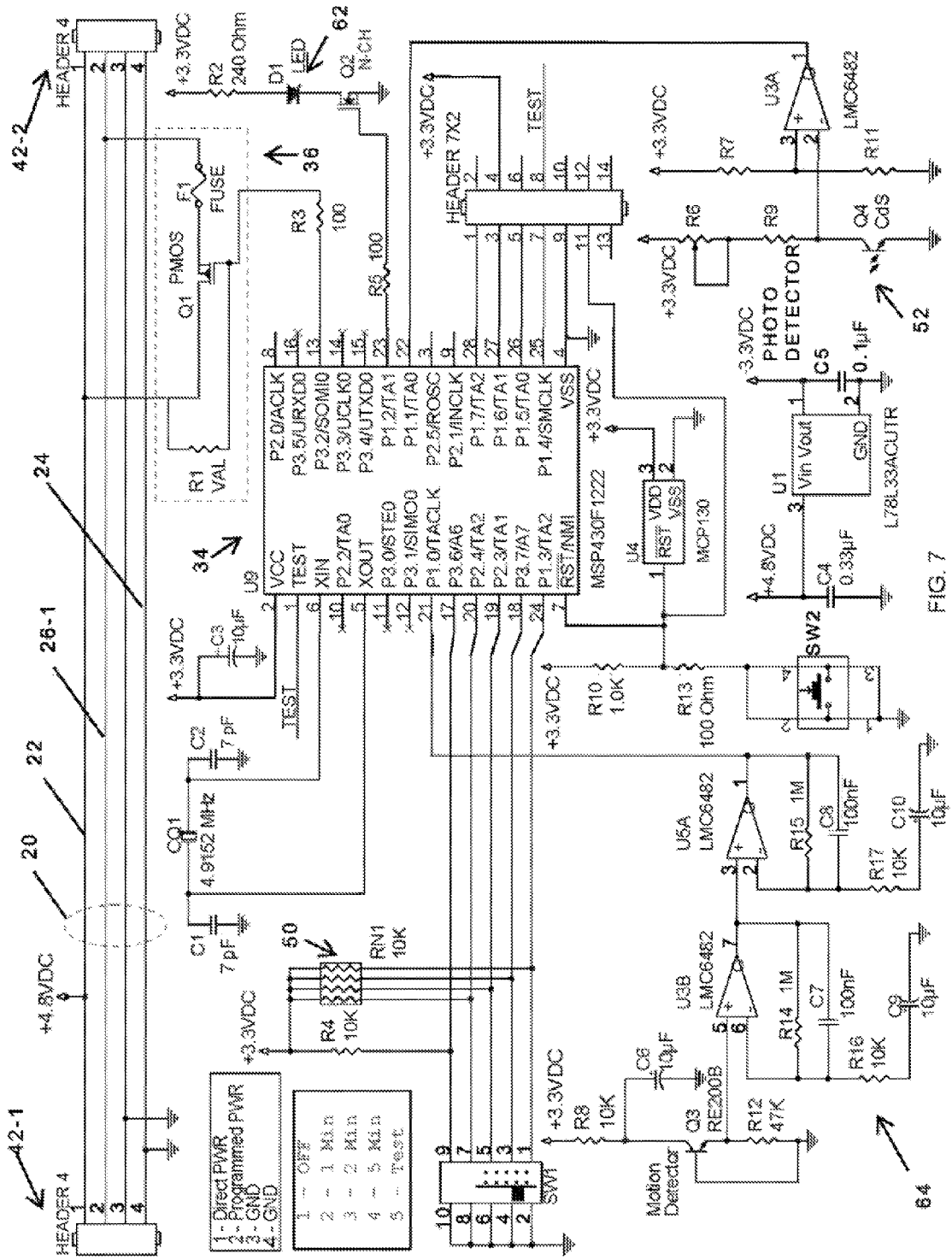
FIG. 7 is a schematic diagram illustrating an example of circuitry included within one embodiment of a photo/motion detection control module.

FIG. 7 is similar to FIG. 6, but illustrates that control module circuitry can include a motion detection circuit 64 (e.g., IR-based) in addition to, or as an alternative to the time-setting switch circuit 50 and the photo-sensing circuit 52. Again, a given control module 14 can be implemented with any one or more of these circuits, and the same underlying circuit board can be used, with selective population of the time-setting switch circuit 50, the photo-sensing circuit 52, or the motion detection circuit 64, thus providing a configurable basis for setting the control module's type. Of course, the microcontroller programming will be set accordingly, or the underlying computer program will be set to perform subsets of control functionality in dependence on being told or otherwise detecting which timing/sensing circuits are installed.

Figure 8:
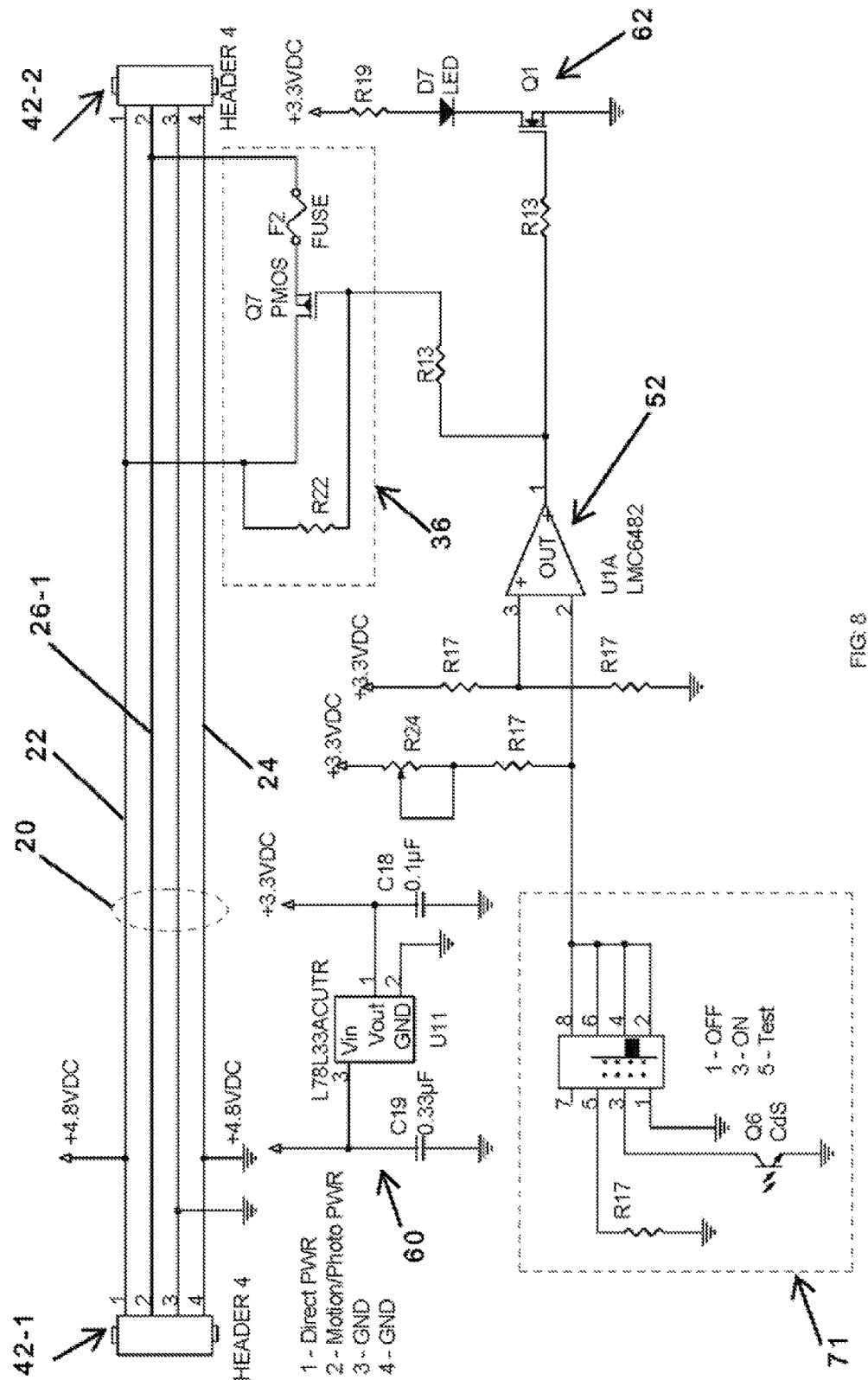
FIG. 8 is a schematic diagram illustrating an example of circuitry included within one embodiment of a photo-sensor control module.

As a further advantage, control module complexity can be reduced at the expense of sophistication and flexibility, by making simplified control module circuits dedicated to particular control functions. FIG. 8 depicts a dedicated photo-sensor type control module 14. Here, the photo-sensing circuit 52 is implemented such that its output directly controls the switching circuit 36. That is, the photo-sensing circuit 52 functions as the control circuit 32 shown in earlier illustrations of the control modules 14, as opposed to providing a programmable processor or other more sophisticated control circuit. Notably, a control switch circuit 71 allows the photo-sensing function to be turned on and off, and allows a user to test the control module 14 by placing it in a test mode, where the control module 14 switches the switched power signal line 26-1 on (or off) irrespective of ambient light detection.

Figure 9:
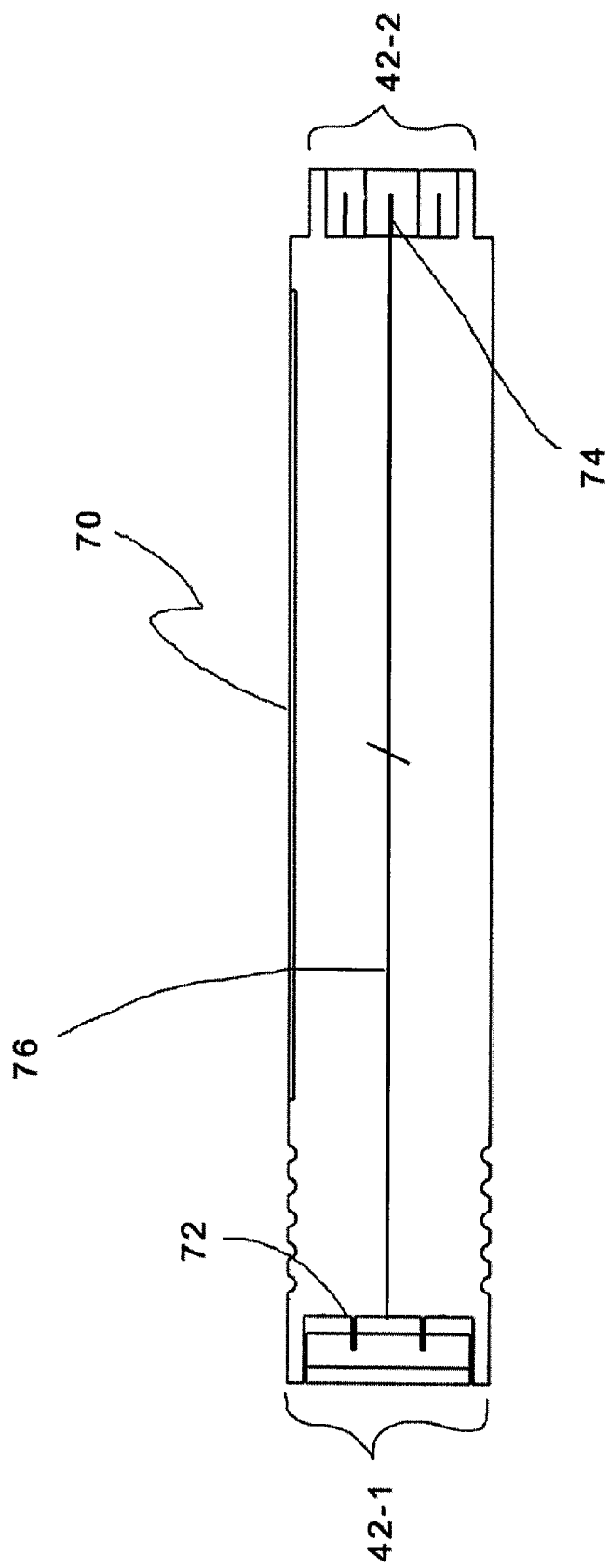
FIG. 9 is a block diagram illustrating an example of a basic housing and connector structure, commonly used for one or more embodiments of power, control, and output modules.

Turning for the moment from electrical details to example mechanical details, FIG. 9 depicts a module 12, 14, or 16 (or a "combo" module that functions as two or more of the defined module types). In other words, the basic structure and form factor of the module shown in FIG. 9 may be used in common for power modules 12, control modules 14, and output modules 16. (However, the range of output modules 16 contemplated herein are, in some cases, implemented using form factors and physical structures complementing the particular function targeted by a particular kind of output module 16.)

One sees that the illustrated module 12, 14, or 16 (or combo) generally comprises a housing 70, which encloses module circuitry (not shown) and inter-module connectors 42-1 and 42-2. For purposes of discussion, one may assume that the connector 42-1 is a female connector positioned at one end of the module's housing 70, and that the connector 42-2 is a male connector positioned at the other end of the module's housing 70. The opposite male/female positioning can be used, and other connector locations are contemplated herein. As a general proposition, the connector positioning provides for easy and robust inter-module connections.

The connector 42-1 includes a number of electrical terminals 72 (e.g., pins, spades, or contacts), and the connector 42-2 likewise includes a number of electrical terminals 74, at least some of which directly correspond to a respective one of the terminals 72 in the connector 42-1. Inter-connector wiring 76 provides interconnection between the connectors 42-1 and 42-2, e.g., wiring connecting terminals for the continuous power signal line 22 and the (system) ground signal line 24, and, possibly, one or more switched power signal lines. Further, as will be illustrated later herein, the connectors 42-1 and 42-2 are configured to provide mechanical as well as electrical coupling, and therefore include physical mating features that provide robust inter-module connections.

Figure 10:
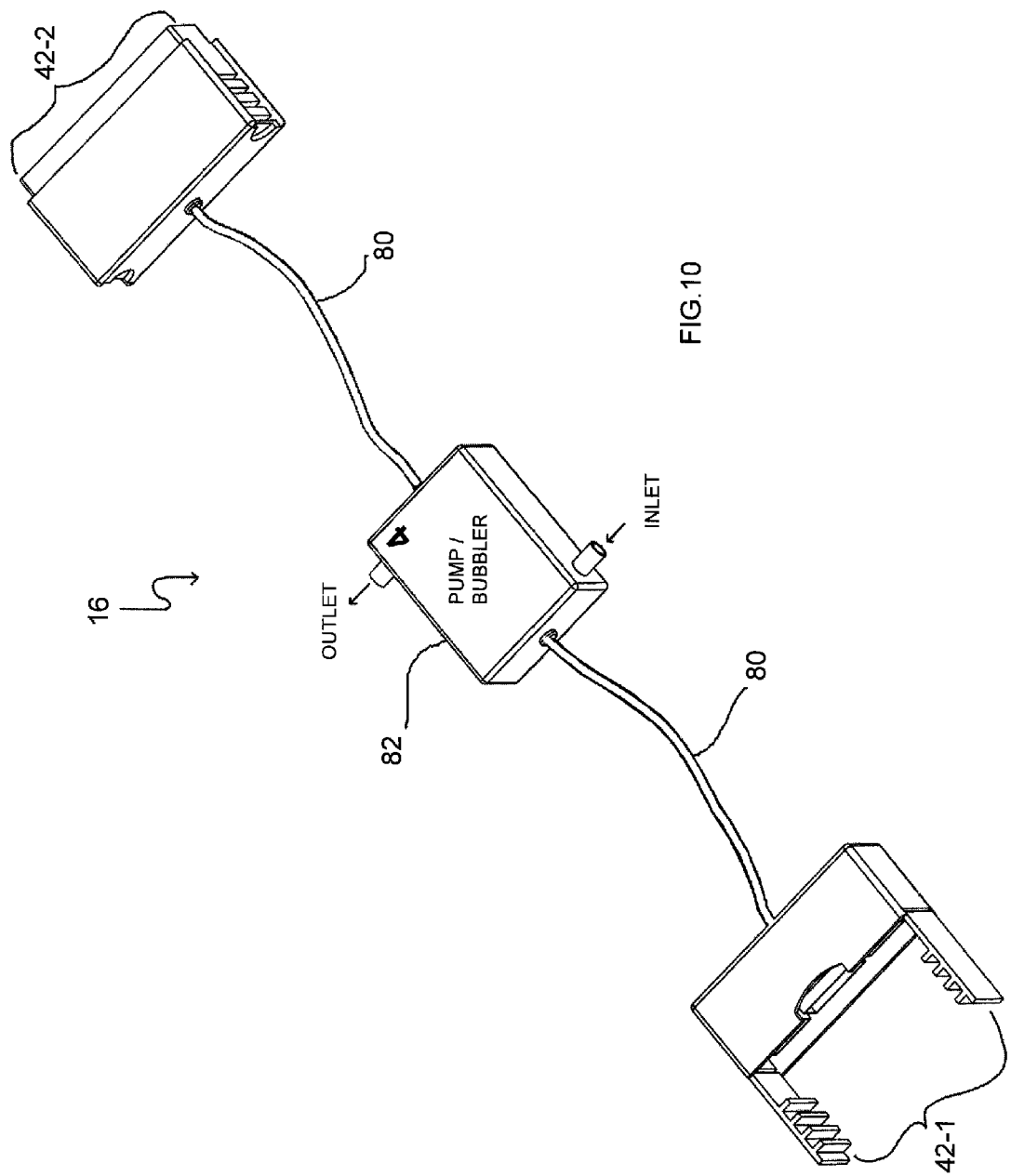
FIG. 10 is a diagram illustrating an example of a pump/bubbler output module disposed along a flexible cable terminating in inter-module connectors, for daisy chaining with other modules in a modular electrical system.

Reliable, standardized inter-module connectivity enhances user convenience and satisfaction, and underlies the use of various module types to form a system 10 that performs a potentially disparate mix of functions desired by a particular user. FIG. 10 directly suggests the wide range of functionality contemplated in this disclosure by depicting a pump/bubbler embodiment of an output module 16. To aid placement of the bubbler output module 16 within a fountain basin, pond, etc., this embodiment couples the connectors 42-1 and 42-2 together via a flexible cable 80, which may be any one of a number of default lengths. A pump (or "bubbler") unit 82 is wired into or otherwise disposed along the length of the cable 80, to allow submersion.

Figure 11:
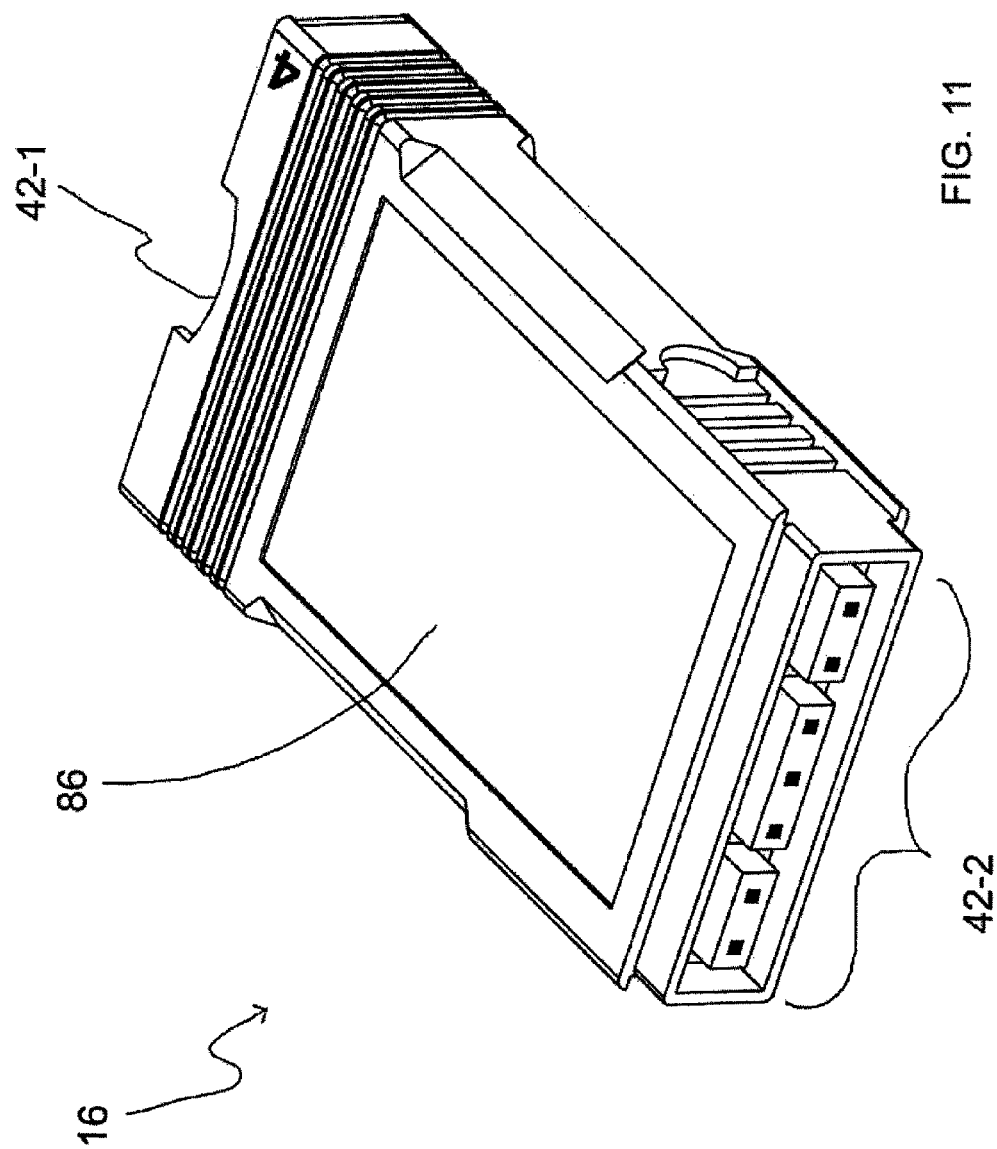
FIG. 11 is a diagram illustrating an example of a lighting output module, wherein a lighting panel is incorporated into an exterior housing of the module.

FIG. 11 illustrates another example of an output module 16. Here, the output module 16 uses a form of the rigid housing 70 shown in FIG. 9, for example, but incorporates a lighting panel 86 into that housing. The lighting panel 86 can be implemented as a diffuse lighting source, a flood lighting source, and thus can be tailored for functional/security lighting, or for decorative lighting. Mounting brackets, shown later herein, may be used to mount the module 16 on the eave of a house, for example, or for affixing the light to a landscaping feature, etc.

Figure 12:
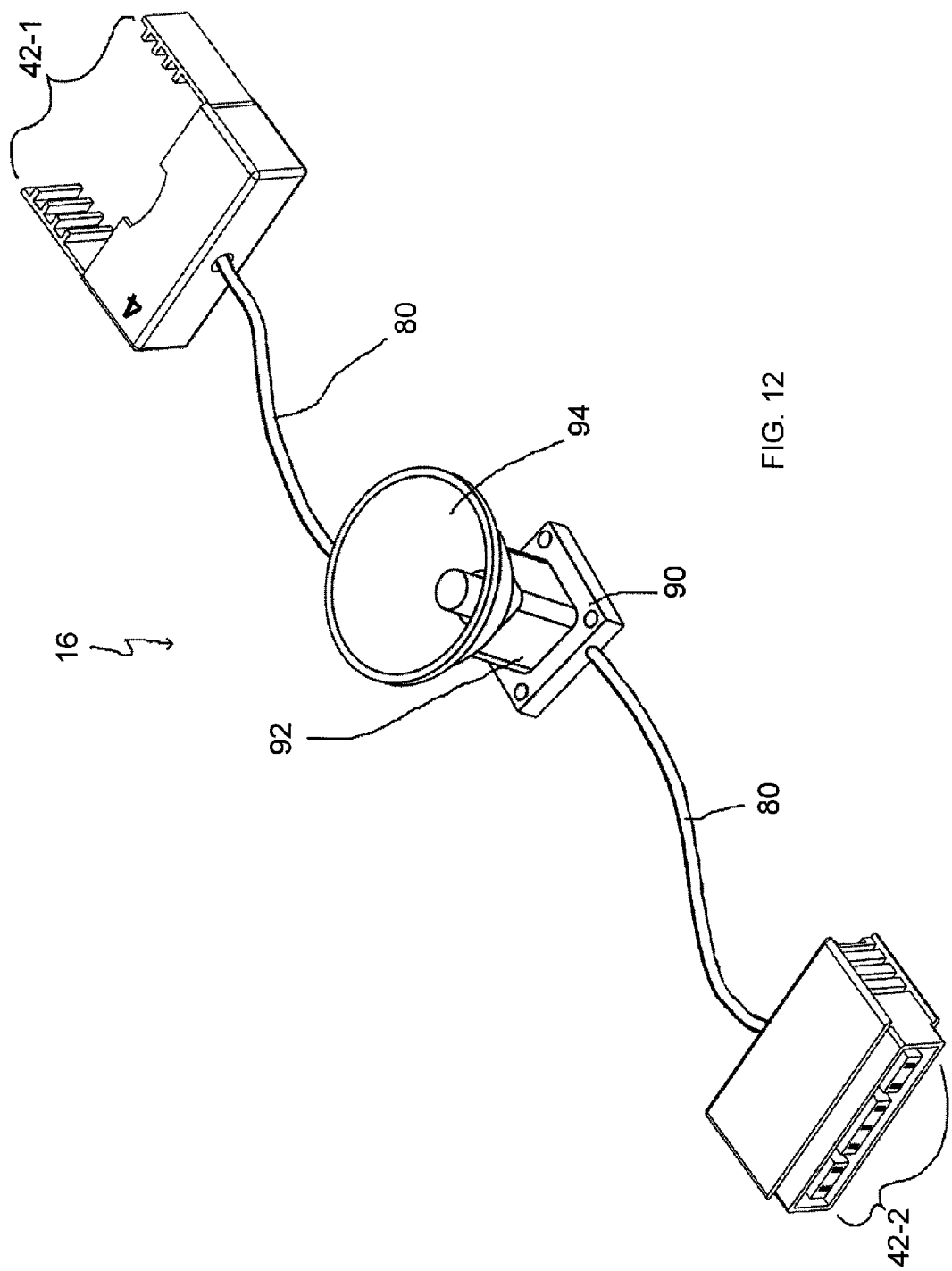
FIG. 12 a diagram illustrating an example of a lighting output module disposed along a flexible cable terminating in inter-module connectors, for daisy chaining with other modules in a modular electrical system.

FIG. 12 depicts another light-based implementation of an output module 16, but where the output module 16 again uses a flexible cable 80 for facilitating a wide range of installation needs, but where a lighting base 90 and included light fixture 92 are disposed along the length of the cable 80. The light fixture 92 accepts a standard or proprietary light 94. For example, given the preferred DC power-based implementation of the system 10/system bus 20, the light 94 may be a low-voltage light. In one embodiment, the light 94 comprises an LED-based light configured for spot or diffuse illumination.

Of course, different types of lights can be installed as needed or desired, provided they retain basic compatibility with the light fixture 92 and the system bus 20. Further, it should be understood that cable 80 with its end connectors 42-1 and 42-2 functions as a flexible extension cord type module, and it can be configured with a range of output module functions other than the illustrated lighting fixture 90, such as music player type output modules, USB charging modules, etc.

Figure 13:
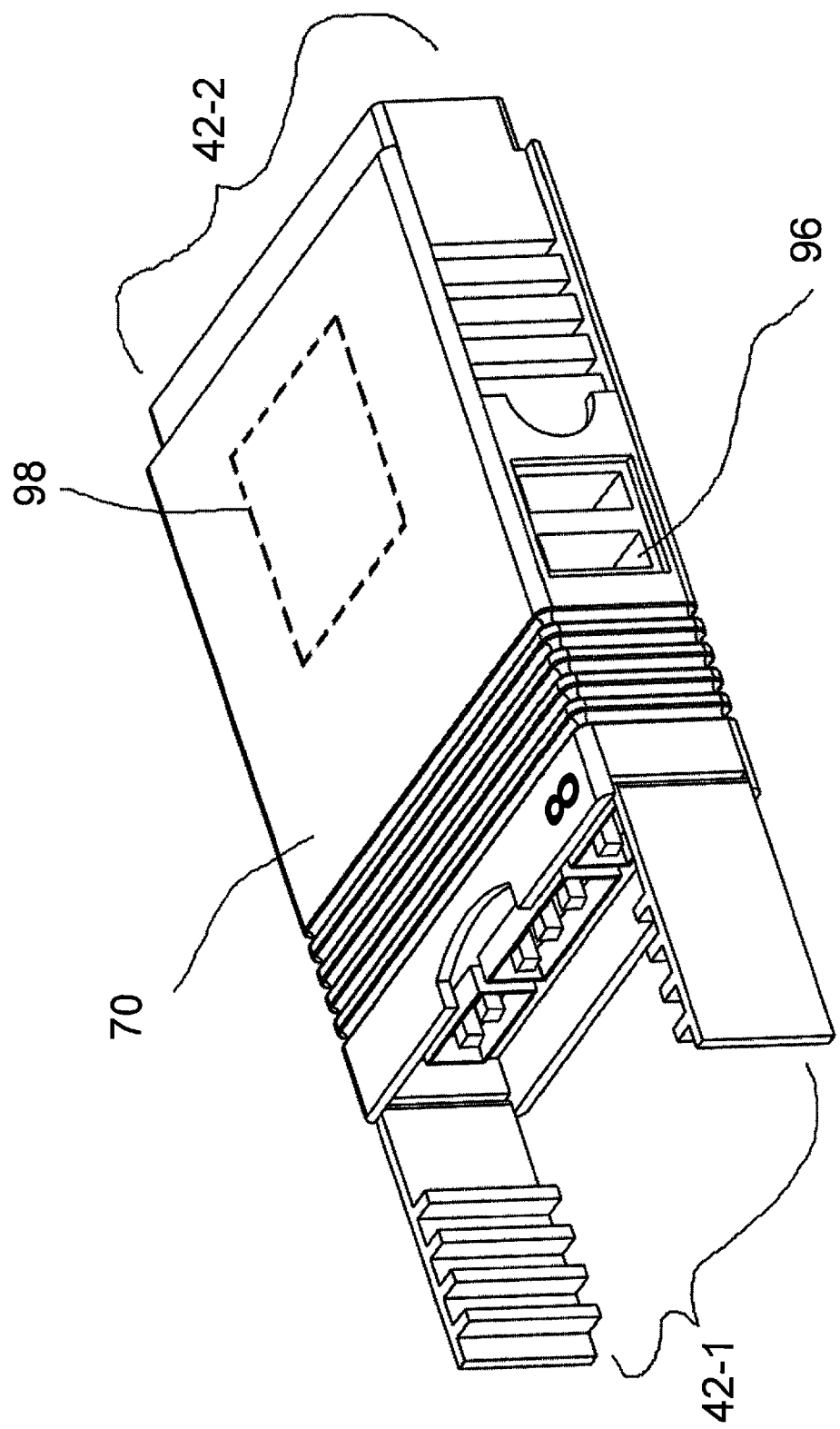
FIG. 13 is a diagram illustrating a USB charging output module having one or more USB charging ports incorporated into an exterior housing of the module.

FIG. 13 depicts yet another output module implementation, wherein an output module 16 uses a rigid housing 70 and provides one or more USB charging ports 96, which are provided with charging power from a USB-compatible charging circuit 98 that is included within the output module 16 (Type-1 and/or Type-2 USB device charging may be provided). The charging circuit 98 may be powered, for example, from the continuous power signal line 22 of the system bus 20, and can be configured, for example, as a buck-mode switching converter having appropriate output voltage/current regulation for USB-compatible charging. In a given system implementation, a user might place the illustrated output module 16 in a physically convenient location (easily reachable) and use it to power MP3 players, cell phones, etc., in an outdoor setting, such as alongside a pool, so that such device may be used and/or recharged while the user engages in outdoor activities.

Figure 14:
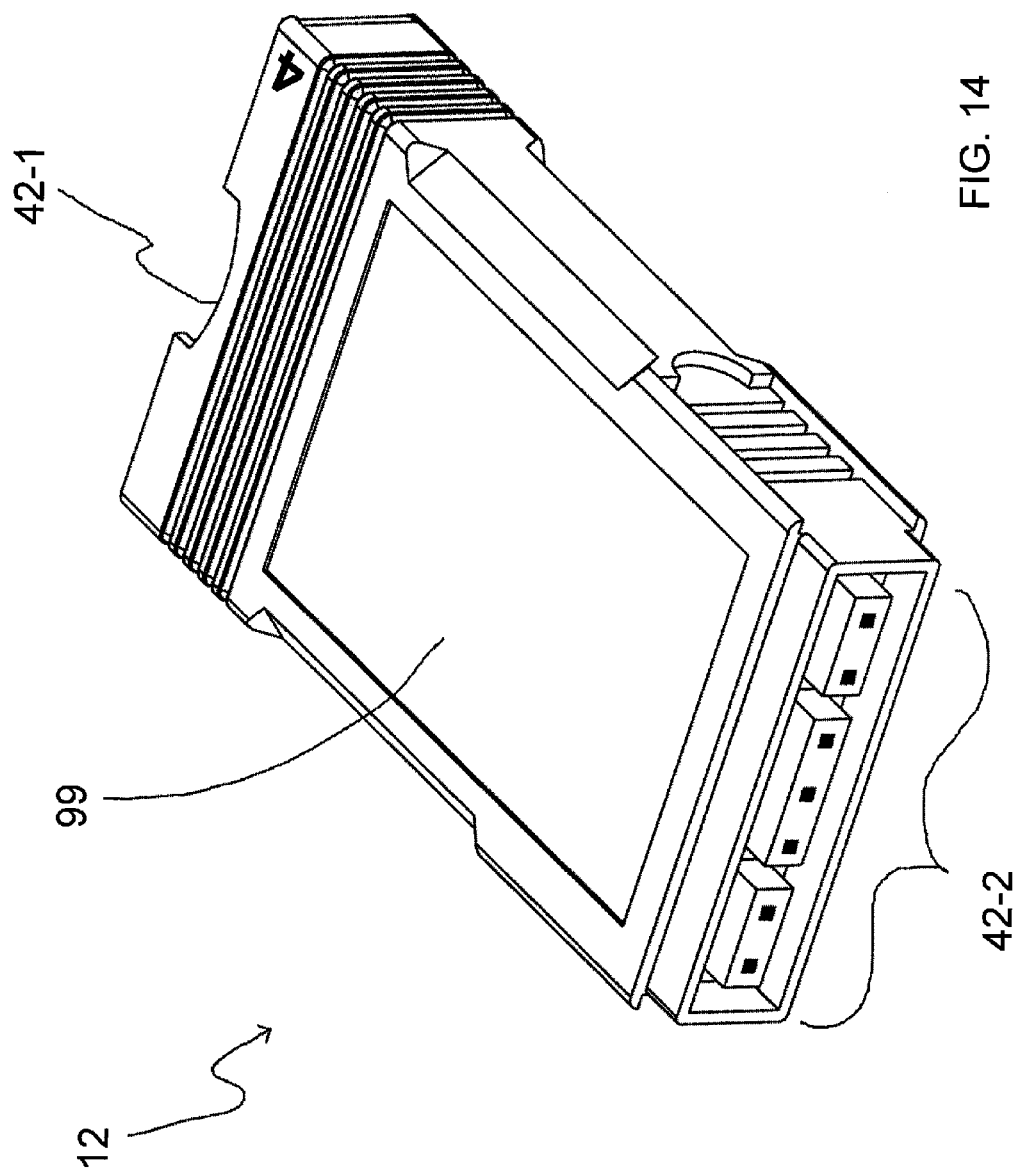
FIG. 14 is a diagram illustrating a solar power module.

In a particularly advantageous approach to providing the above convenience and functionality, at least one embodiment of the system 10 includes an extension cord type "module" having standardized end connectors 42-1 and 42-2. The extension cord allows for flexible placement of a given module, while still allowing it to be series-connected within a larger collection of modules forming the system 10. As a further advantage, one or more of the power modules 12 in the system 10 comprises a solar power module 12, providing solar-derived power during sunny conditions and, optionally, providing battery-derived power at other times. FIG. 14 illustrates an example embodiment, wherein the power module 12 includes a photovoltaic panel 99.

Figure 15:
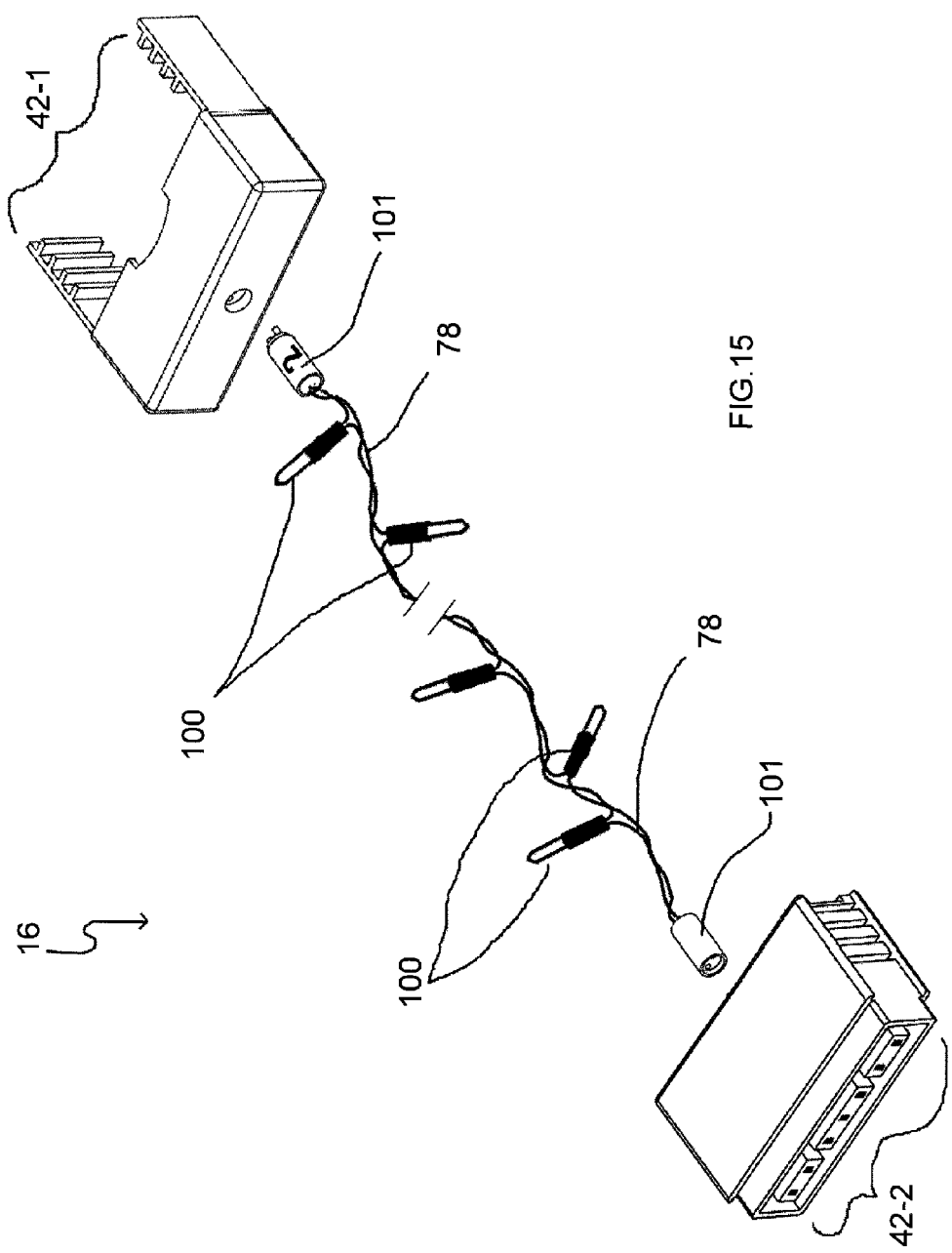
FIG. 15 is a diagram illustrating an example of a lighting output module having a plurality of decorative lights disposed on a flexible cable terminating in inter-module connectors, for daisy chaining with other modules in a modular electrical system.

FIG. 15 depicts yet another output module implementation, wherein an output module 16 uses a flexible cable 78 to interconnect its connectors 42-1 and 42-2. Here, however, the flexible cable is modified to include or otherwise carry a plurality of decorative lights 100. The lights 100, which may be low-power LEDs, provide for a range of decorative lighting effects, which may be particularly suited for seasonal lighting applications, but can be used year-round, such as to accent a particular landscaping feature, such as stone walls, trees, etc. This particular module implementation may, therefore, be provided in a number of extended cable lengths.

In an advantageous implementation, the inter-module connectors 42-1 and 42-2 are themselves modular, and the flexible cable 78 includes end connectors 101, allowing the flexible cable 78 to plug into the end connectors 42-1 and 42-2, for series connection with other modules in a given system 10.

Figure 16:
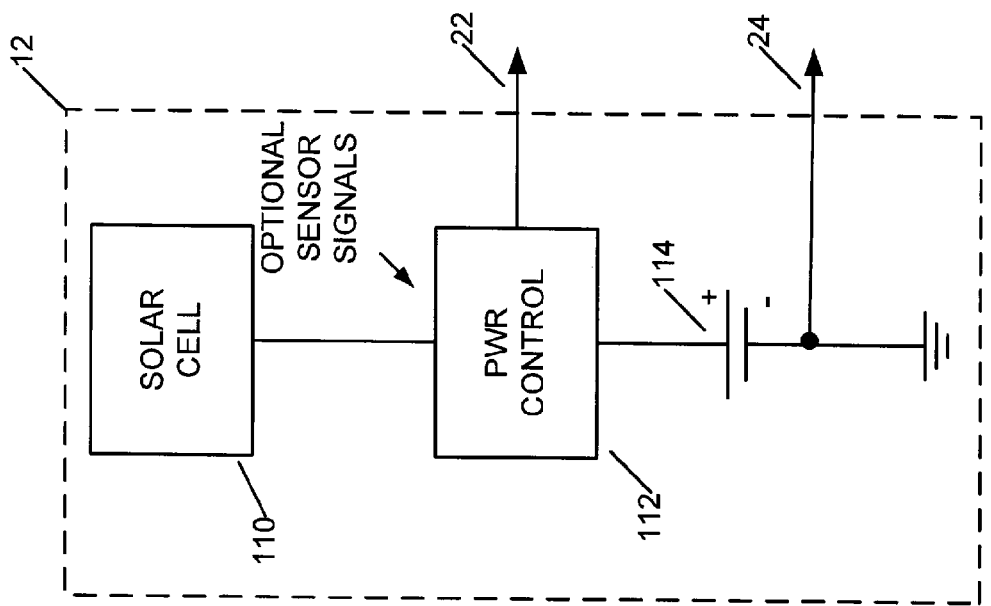
FIG. 16 is a schematic illustrating an example of a power module having a solar cell and rechargeable battery which are electrically coupled to an associated power control circuit.

The variety contemplated for output module configurations may be in similar fashion to the other module types. For example, FIG. 16 illustrates a power module implementation, wherein a power module 12 includes a solar cell (photovoltaic panel) 110 that is coupled to a power control circuit 112. In one embodiment, the power control circuit 112 provides voltage regulation and, optionally, surge and reverse polarity protection) for outputting a regulated voltage on the continuous power signal line 22 of the system bus 20. The power module 12 also may be implemented with a rechargeable battery 114, where the power control circuit 112 is configured to provide solar-based charging of the battery 114, and to provide voltage sourcing control to allow output voltage to be taken either from the solar cell 110 or from the battery 114.

Figure 17:
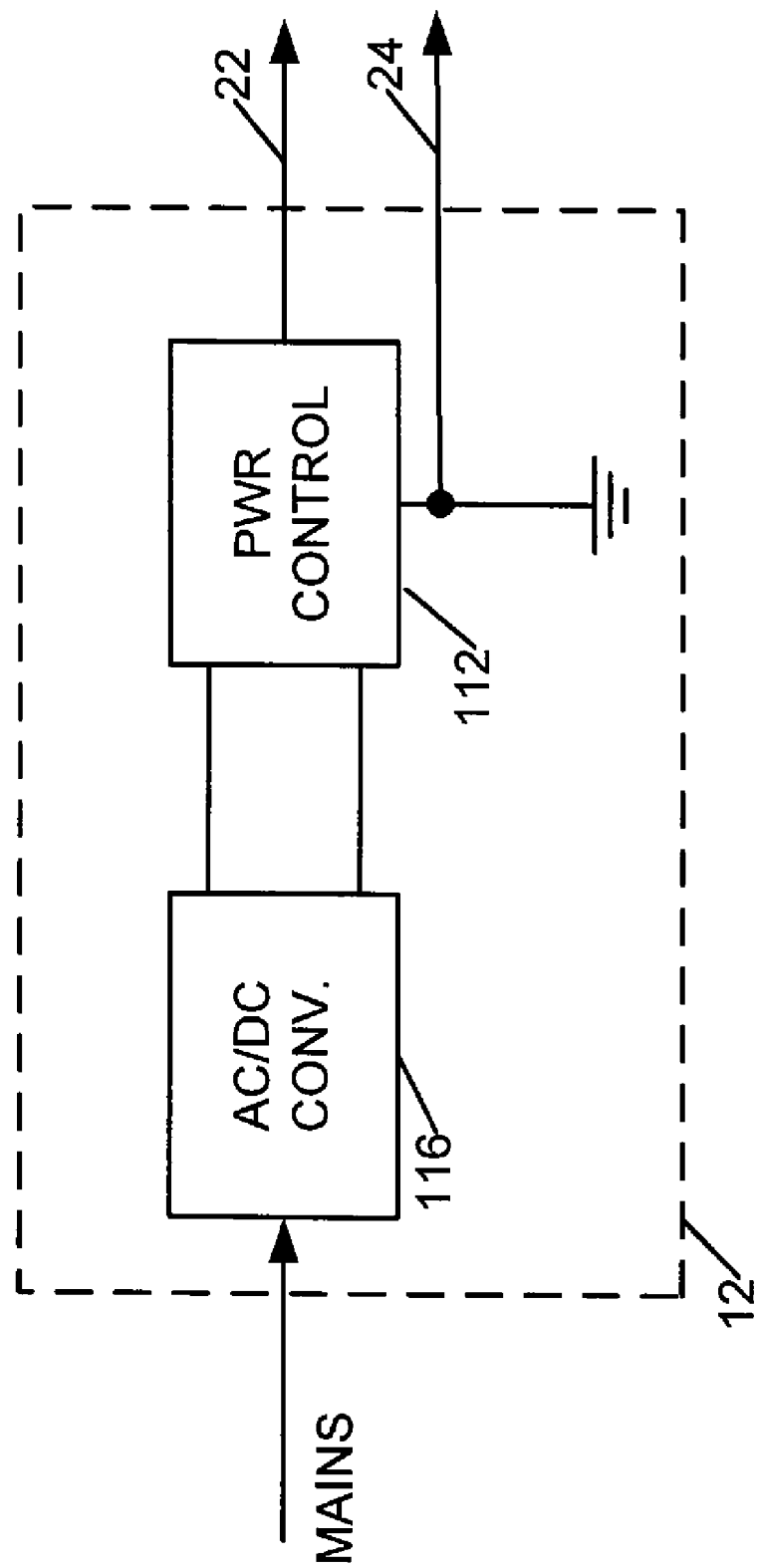
FIG. 17 is a block diagram illustrating an example of a power module having an AC/DC conversion circuit, along with an associated power control circuit.

FIG. 17 illustrates another power module implementation, wherein the power control circuit 112 is configured to provide a regulated output voltage in conjunction with an AC/DC conversion circuit 116. It will also be understood that the AC/DC conversion circuit 116 can be implemented at least in part using an external transformer circuit (such as was suggested by the depiction of a wall charger in the illustrations of FIGS. 1 and 2).

It will also be understood that any given power module 12 supplies a finite amount of power for use in any given system implementation. Thus, given users might assemble a system 10 using a collection of module types (and specific module implementations) where the amount of power required for operating the system 10 dictates the number and/or type of power modules 12 that must be included in the system 10. It is therefore contemplated herein that the modules themselves be marked with indicia that directly enables users to assemble systems 10 that "balance" the available power (as provided by power modules 12) with the required power as consumed primarily by output modules 16, but also to a lesser extent by control modules 14. Combo modules that integrate, for example, control and output functionality will, as a general rule, consume more power than control-only and output-only modules.

Figure 18:
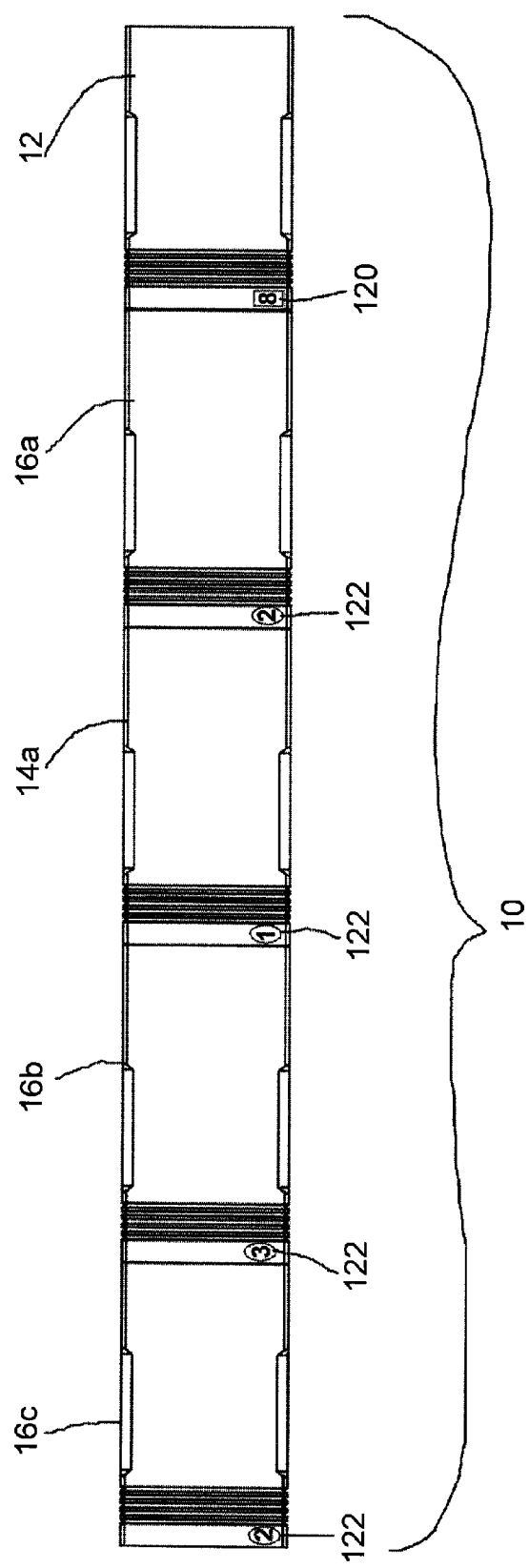
FIG. 18 is a diagram illustrating indicia marked on exterior housings of power, control, and output modules, indicating the amount of power each module provides to the system or the draws from the system.

FIG. 18 illustrates one embodiment of the indicia marking contemplated herein for the system 10. In particular, each power module 12 is adorned, stamped, engraved, or otherwise marked with indicia 120 indicating the amount of power provided by that power module 12. (Different power module implementations generally have different output power capabilities, so different types of power modules 12 generally will have different indicia values.) In a particular embodiment, the indicia 120 comprises a human-readable marking, e.g., a printed Arabic numeral, that indicates the output power of the power module 12 in integer "units" of power. For example, on a 10 Watt scale, the number "10" indicates ten Watts of output power, while the number "1" indicates one Watt of output power. Similarly, on a one Watt scale, "1" indicates 0.1 Watts.

In similar fashion, each output module 16 is adorned, stamped, engraved, or otherwise marked with indicia 122 indicating the amount of power consumed by that output module 16. Different output module implementations generally have different power consumptions, so different types of output modules 16 generally will have different indicia values. In a particular embodiment, the indicia 122 comprises a human-readable marking, e.g., a printed Arabic numeral, that indicates the power consumption (requirements) of the output module 16 in integer "units" of power. Control modules 14 can likewise be marked according to their power requirements. Note that the markings can indicate worst-case values, or can be based on expected operating norms. That latter approach may be more realistic in view of the number of modules that can be strung together to form a system 10.

With the complementary power output and power consumption markings, a given user is guided toward deployment of a balanced system 10 simply by matching power module indicia 120 to control/output module indicia 122. For example, in the illustrated system 10, the user has assembled a system 10 having one power module 12 having indicia 120 that indicates a power output of "8" units. The user further has included in the system 10 a control module 14a having indicia 122 that indicates a power consumption of "1" unit, an output module 16a having indicia 122 that indicates a power consumption of "2" units, an output module 16b having indicia 122 that indicates a power consumption of "3" units, and an output module 16c having indicia 122 that indicates a power consumption of "2" units.

The numeric summation of indicia values for all indicia 120 is eight (8), and the numeric summation of indicia values for all indicia 122 also is eight (2+1+3+2=8). As such, the system 10 is balanced in terms of the available power provided to the system bus 20 by power modules 12 and the required power taken from the system bus 20 by the control modules 14 and output modules 16. Notably, indicia 120 may be styled distinctively with respect to indicia 122, making it easier for users to identify power providers versus power consumers when assembling a system 10. For example, indicia 120 may be boxed, while indicia 122 may be circled. Additionally, or alternatively, indicia 120 and 122 may be color-coded, e.g., indicia 120 are marked in green, while indicia 122 are marked in red. (In a further elaboration, all or part of a module's housing may carry this style of power-related color coding.) Still further, rather than Arabic numerals, the indicia 120 and 122 may be implemented as graphic elements, e.g., stars, tick marks, boxes, circles, etc., where the element count or other visual characteristic indicates a module's power output or power consumption.

Figure 19:
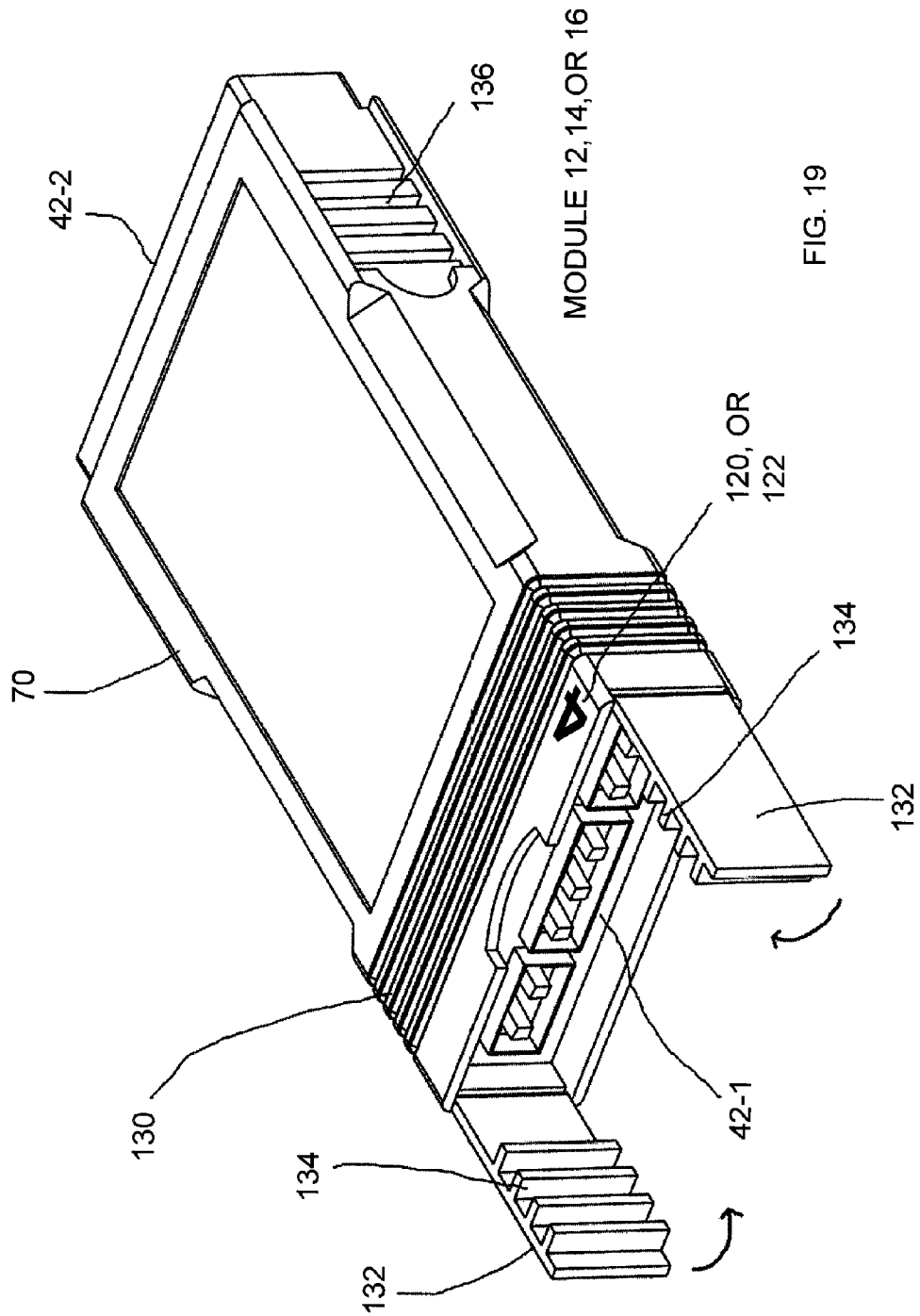
FIG. 19 is a diagram illustrating an example of a module housing having flexible bellows, which allow interconnected modules to bend and/or move relative to each other, and a pair of folding tabs configured to engage complementary mating features on an adjacent module.

FIG. 19 provides a further example depiction of indicia marking for a given module, which may be a module 12, 14, or 16, or a so called combo module implemented as a hybrid of module types. One sees indicia 120 (or 122) on the exterior of the module's housing 70, indicating "4" units of power output (or power consumption) for the illustrated module.

Of further interest, FIG. 19 illustrates an advantageous mechanical structure contemplated for one or more module embodiments. Here, the module includes a flexible "bellows" portion 130 integrated within its housing 70, for at least one of its connectors 42-1 and 42-2. That is, the connector-portion of the housing 70 is, at least at one end, integrated with and coupled to the remainder of the module housing 70 via a flexible element (e.g., the depicted flexible bellows portion 130). This feature directly enables a daisy chain of interconnected modules to bend and/or move, i.e., two interconnected modules can bend or move relative to each other, which prevents the application of force to an assembled system 10 of modules from causing individual modules to disconnect.

Further aiding robust inter-module connectivity, one sees that the housing 70 includes a pair of folding tabs 132 at one or both ends of the module. Here, the housing 70 integrates or otherwise includes a pair of tabs 132 disposed adjacent to the connector 42-1. These tabs 132 serve the twofold purpose of protecting the connector 42-1 when the connector 42-1 is not in use, and engaging another module that is plugged into the connector 42-1.

To enable that latter function, the tabs 132 include one or more physical mating features 134 (ribs or fingers are shown for example purposes) that are configured to mate with complementary mating features in the housing 70 of the other module that is plugged into the connector 42-1. For example, the other end of the depicted housing 70—i.e., the end enclosing the other connector 42-1—has mating features 136 configured to interface with and engage the tabs 132 of the next module in the chain.

Figure 20:
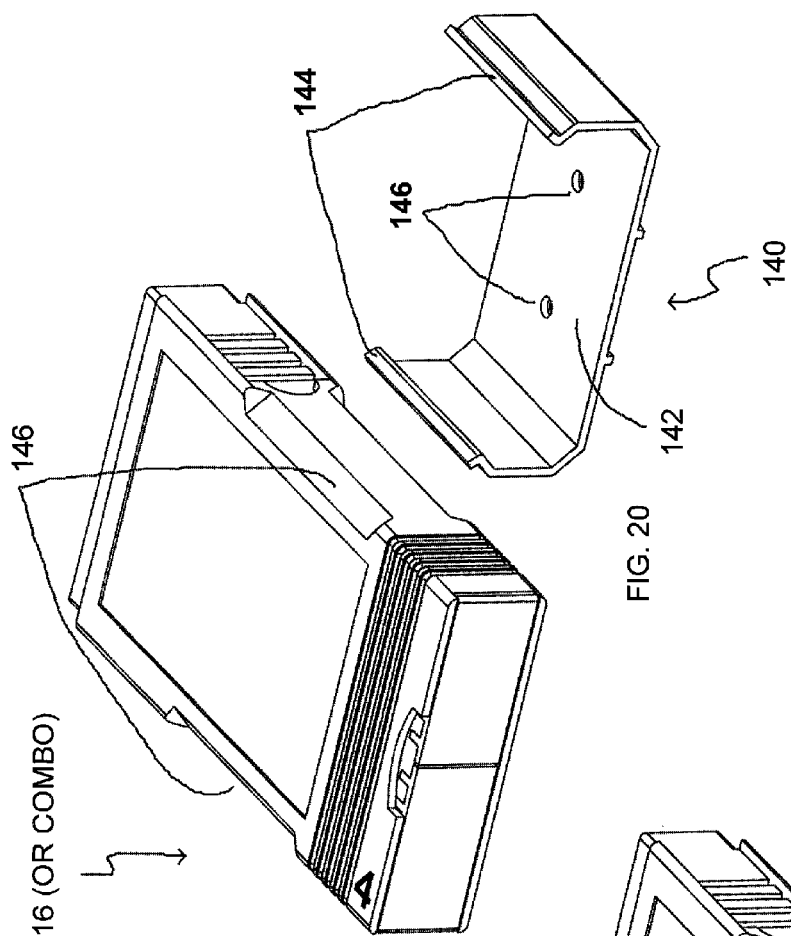
FIGS. 20 and 21 are diagrams illustrating an example of a mounting bracket and the corresponding mating features on a module housing that allow the module to snap into the mounting bracket.

The inter-module mechanical mating thus depicted greatly aids in the deployment of robustly interconnected modules for a given system 10. Further aiding this robustness, FIG. 20 depicts an optional mounting bracket 140. Each such bracket 140 is configured to releasably retain a module mounted therein, and each such bracket 140 includes a mounting section 142 for mounting the bracket 140 to a (preferably flat) surface and a housing retention section 144 for releasably retaining a module mounted therein. In one embodiment, the mounting section 142 includes slots or holes for screwing, nailing, or otherwise fastening the bracket 140 to a mounting surface.

Figure 21:
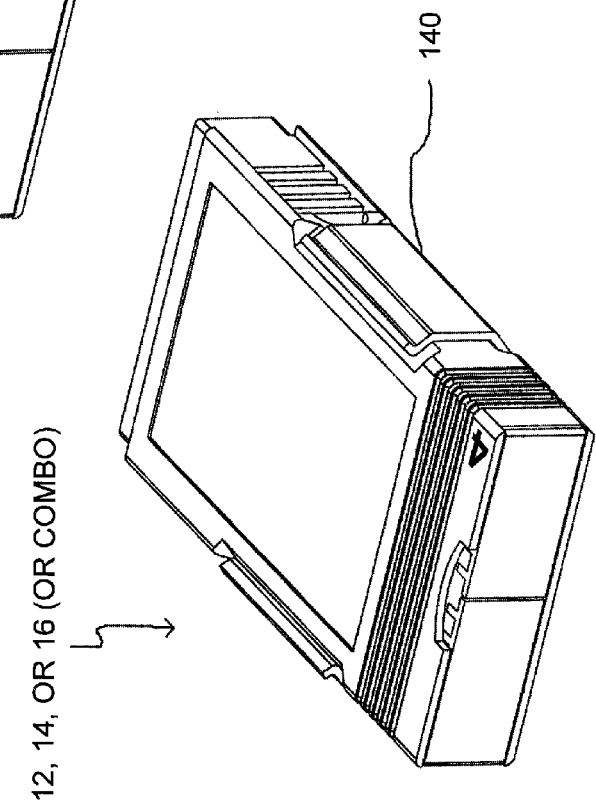

FIG. 21 illustrates the same bracket 140, but where the depicted module 12, 14, 16 (or combo) has been snapped into place within the housing retention section 144 of the bracket 140. It will be understood that module housing 70 includes slots, ribs, flares, bevels, or other physical features 146 that facilitate snapping the module into the housing retention section 144. It will also be appreciated that the bracket 140 is made from a strong but flexible material, preferably with good corrosion resistance (innate or via coating), such that the arms, rails, or other elements comprising the housing retention section 144 are flexible enough to provide for easy snapping and unsnapping of a module into the bracket 140, while still providing sufficient "spring" to tightly grip the snapped-in module.

Figure 22:
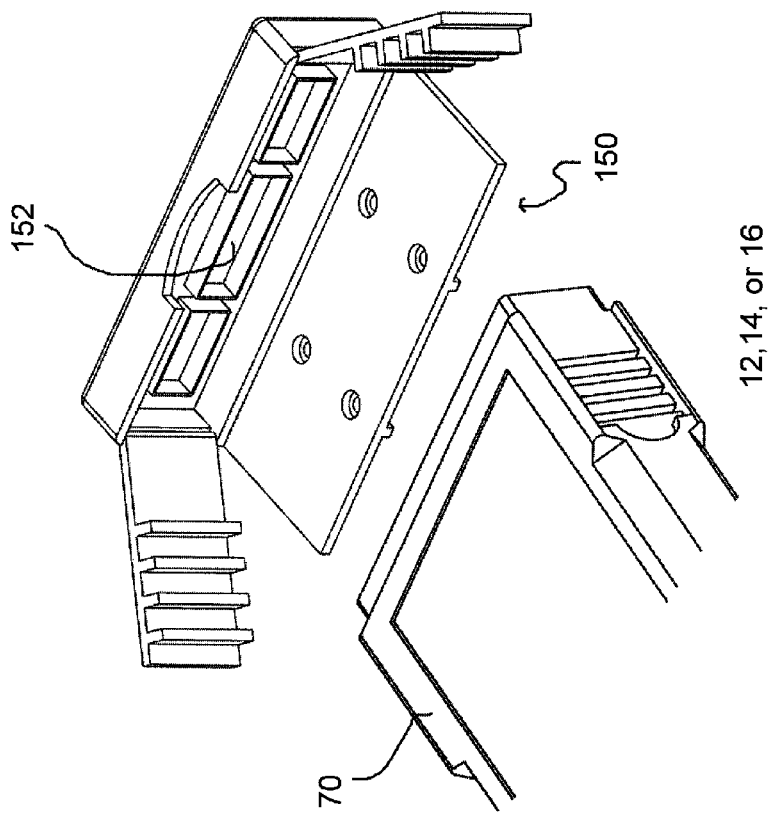
FIGS. 22-24 are diagrams illustrating an example of an end bracket, for terminating a series chain of modules.
Figure 23:
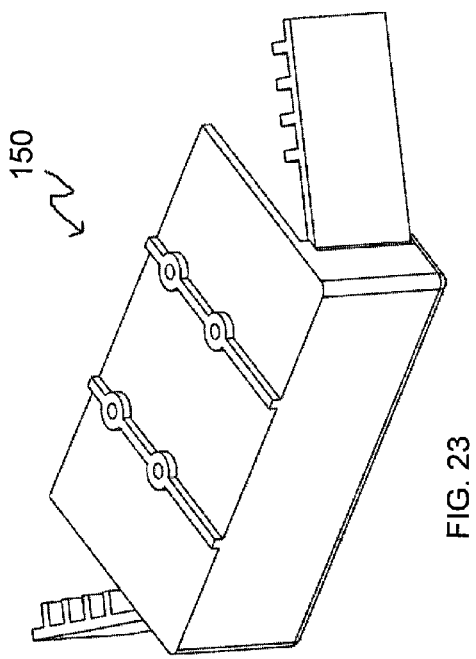

FIG. 22 illustrates an end bracket 150, used to securely terminate a daisy-chain of modules. Advantageously, the end bracket 150 includes mating receptacles 152 and end flaps, for mating with and sealing (e.g., weatherproofing) the corresponding mating connector 42-1 or 42-2 of the module being terminated. This arrangement allows the user to provide a secure mechanical and electrical termination for a given daisy-chain of modules. FIG. 23 illustrates a bottom view of the same end bracket 150, emphasizing the optional inclusion of mounting holes, for robustly securing the end bracket 150 to a given mounting surface, and FIG. 24 illustrates an optional bracket cover 166.

Figure 24:
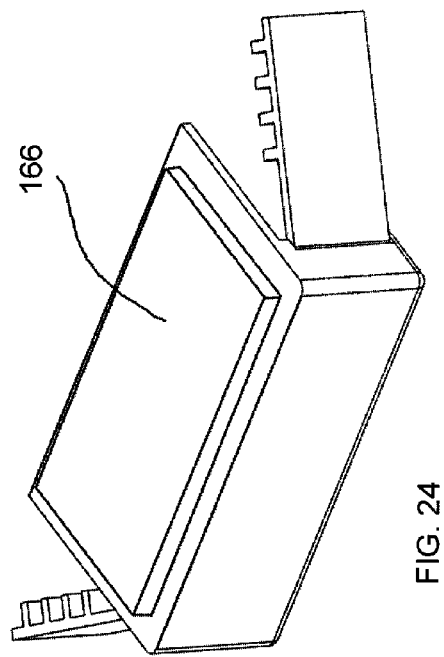

FIG. 24 illustrates another contemplated module form factor that is particularly well suited for control modules 14, or any other module type that provides on/off or other user interface controls. The illustrated module includes one or more control or configuration switches 168, and optionally includes a photosensor 170, such as for overall module on/off or other control. The module's exterior may include engravings, markings, etc., to label the switch functions, and one or more of the switches may be illuminated.

Figure 25:
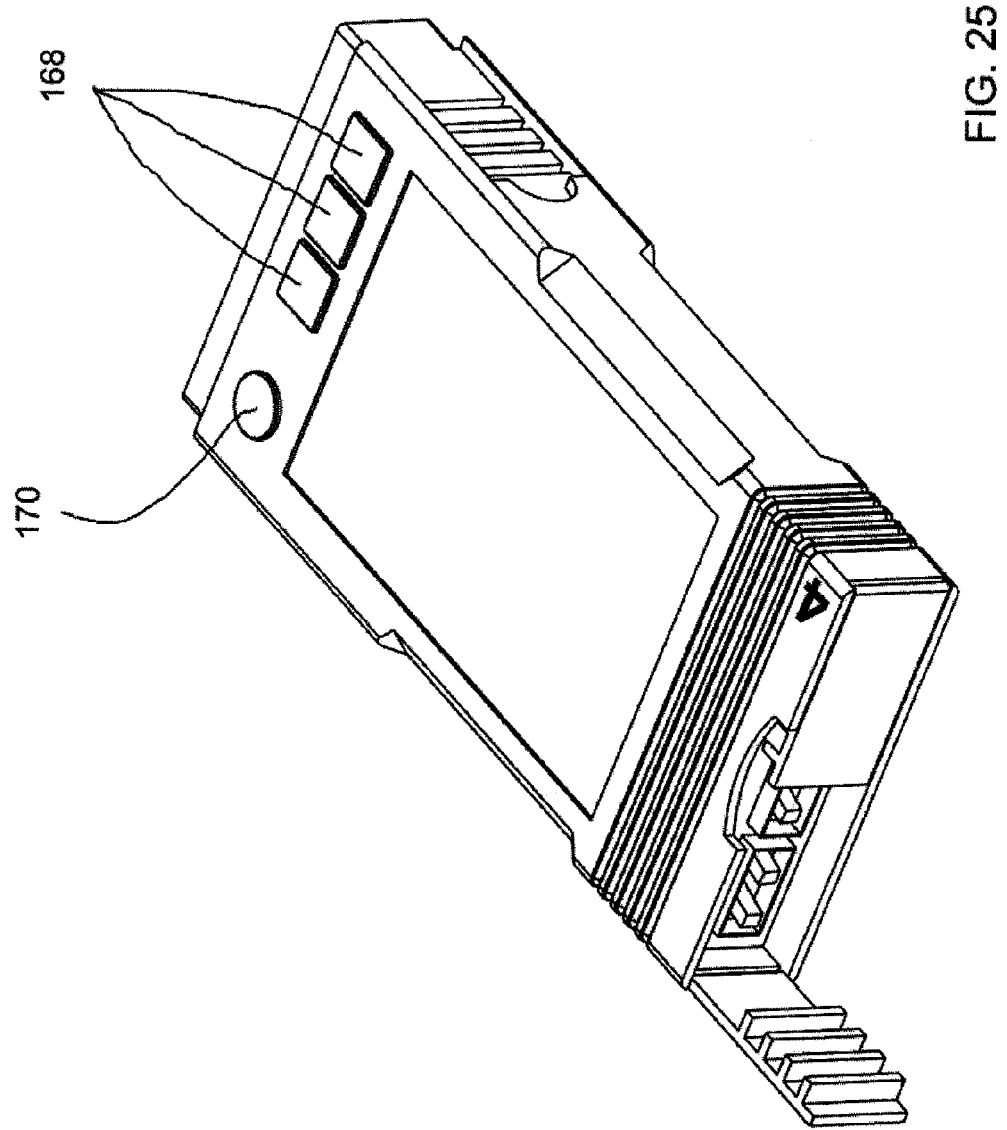
FIG. 25 is a diagram of a module that includes one or more user interface/control buttons, for programming or otherwise controlling the module.
Figure 26:
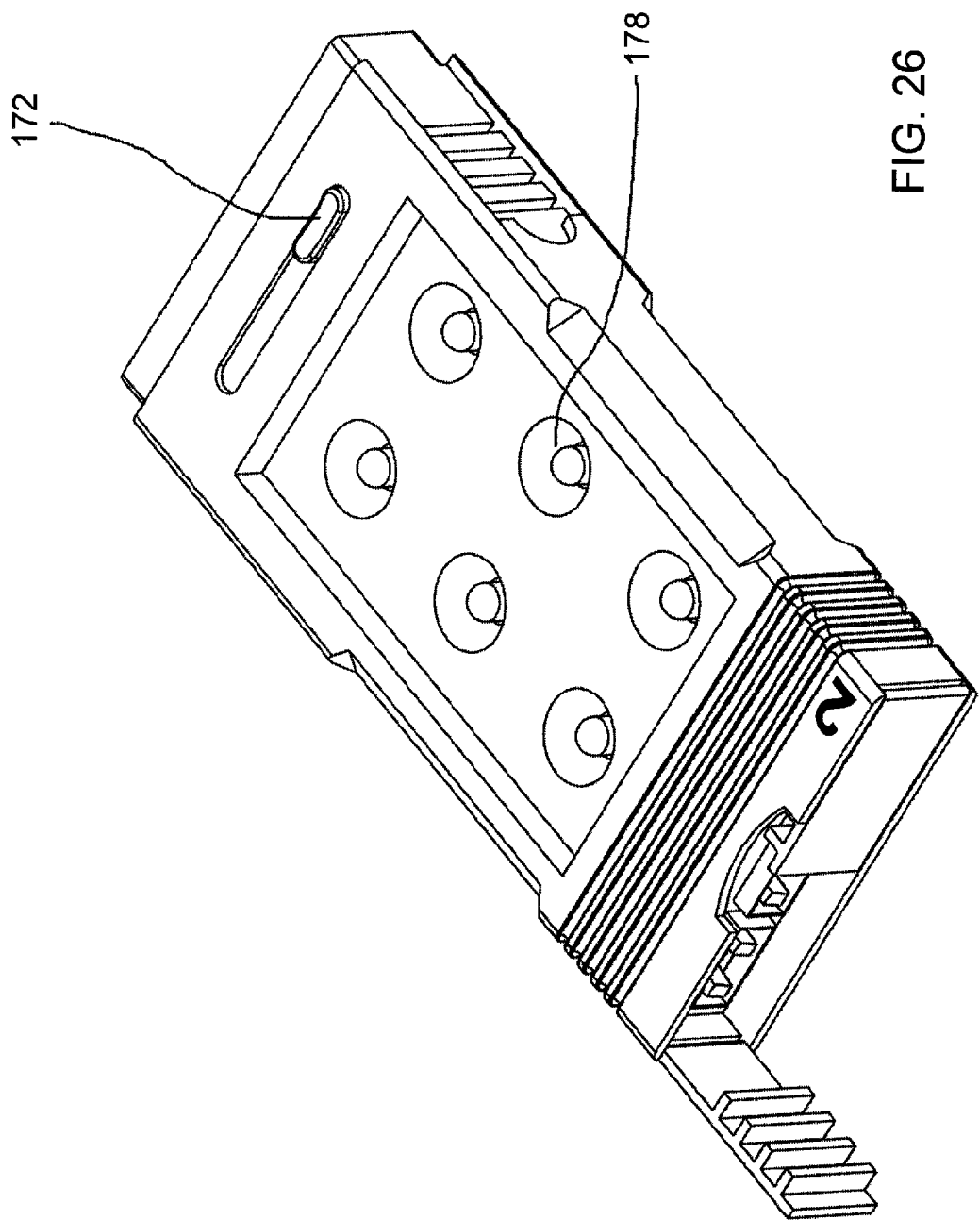
FIG. 26 is a diagram of an example lighting module that includes an array of LEDs for low-power lighting.

Similarly, FIG. 25 illustrates a contemplated configuration for an output module 16, that includes a switch 172 that provides for on/off control in one embodiment, and provides for continuous power or switched-power operation in another embodiment. One also sees that the module's face includes an array of LEDs 178, to provide low-power lighting.

With all of the above variations in mind, those skilled in the art will appreciate that the system 10 can be implemented with various features and physical/electrical configurations. Advantageously, however, the different module types 12, 14, and 16 all are based on like male/female connectors and associated wiring, such that users are free to form modular systems 10, with essentially arbitrary numbers and mixes of modules. Further, it should be understood that all modules generally are weatherproofed via seals, gaskets, potting, etc., as needed, to enable users to deploy systems 10 for residential lighting and landscape enhancement with high reliability under a variety of conditions.

As such, the present invention is not limited by the foregoing description, nor by the accompanying illustrations. Instead, the present invention is limited only by the following appended claims and their legal equivalents.

What is claimed is:

1. A system of electrical modules for implementing a consumer-configurable modular electrical system, said system of electrical modules comprising:
   a plurality of modules including power modules, control modules, and output modules;
   said power modules configured to provide power for powering attached control and output modules, said control modules configured to provide a control signal for controlling one or more attached output modules, and at least one said output module configured to perform a predefined function responsive to the control signal;
   wherein all said modules include like mating connectors and like connector wiring, forming a system bus across any given plurality of said modules that are serially interconnected in a daisy chain; and
   wherein each power module includes indicia on an exterior portion of the module that identifies a number of power units the power module provides, and wherein each output module includes indicia on an exterior portion of the module that identifies a number of power units the output module consumes.

2. The system of claim 1, wherein one type of power module comprises a solar power module that is configured to provide power derived from an included photovoltaic cell.

3. The system of claim 2, wherein the solar power module includes a power control circuit and a battery, and wherein the power control circuit is configured to recharge the battery via the photovoltaic cell.

4. The system of claim 1, wherein the mating connectors and connector wiring of the modules are standardized across the system, such that any module can be coupled to any other module, for forming the system with a desired mix and ordering of module types in a daisy chain of interconnected modules.

5. The system of claim 1, wherein the system bus includes a continuous power line and at least one switched power line, and wherein each power module is configured to provide a continuous power signal on the continuous power line of the system bus, and each control module is configured to provide a switched power signal as its control signal on one of the at least one switched power lines in the system bus.

6. The system of claim 5, wherein each control module is configured to provide its switched power signal by selectively energizing a switched power line terminal of the control module via the continuous power signal provided to the control module on a continuous power line terminal of the control module, according to a control function of the control module.

7. The system of claim 6, wherein each control module comprises one of a programmable timer module configured to selectively energize the switched power line terminal at programmed times or intervals, a temperature detection module configured to selectively energize the switched power line terminal responsive to detecting ambient temperature relative to one or more thresholds, a motion detection module configured to selectively energize the switched power line terminal responsive to detecting motion of an object within a spatial area monitored by the motion detection module, or a photosensitive module configured to selectively energize the switched power line terminal responsive to detecting ambient light conditions.

8. The system of claim 5, wherein the control modules are configured such that, in a daisy chain of interconnected modules that includes two or more control modules, output modules in the daisy chain are controlled by the switched power line signal of the first preceding control module.

9. The system of claim 5, wherein the system bus includes two switched power lines, and wherein each control module includes a user-settable switch to control which switched power line is operated on by the control module, and each output module includes a user-settable switch to control which switched power line the output module operates from.

10. The system of claim 1, wherein there are one or more types of output modules, including at least one of a lighting module, a DC motor module, a DC pump or bubbler module, a DC output power module, a USB charger module, an audio player or recorder module, a digital camera or video recorder module, a fan module, and an animal or insect repellent module.

11. The system of claim 1, wherein each power module comprises one of a solar power module, a rechargeable battery module, a combined solar power/rechargeable battery module, and an AC/DC converter module.

12. The system of claim 1, wherein each module includes a female connector, a male connector, and electrical wiring interconnecting corresponding terminals in the male and female connectors for carrying the system bus through the module, and wherein the male connector of each module is configured to be electrically and mechanically compatible with the female connector of any other module and the female connector of each module is likewise configured to be electrically and mechanically compatible with the male connector of any other module.

13. The system of claim 1, wherein each module comprises a housing with a male connector at one end, and a female connector at the other end, thereby enabling a daisy chain of modules to be interconnected end-to-end by connecting the male connector of one module with the female connector of another module.

14. The system of claim 13, wherein each module further includes a pair of flexible tabs at the male connector end, the female connector end, or both, and wherein each pair of tabs is configured to pivot between a closed position wherein they cover and protect the adjacent connector, and an open position wherein they extend outward from the adjacent connector for physically coupling to the housing of another module that is plugged into the adjacent connector.

15. The system of claim 13, wherein the housing of each module includes at least one flexible bellows section that terminates in one of the male and female connectors of the module, to impart flexibility along a daisy chain of interconnected modules by allowing relative movement between interconnected modules in the daisy chain.

16. The system of claim 1, wherein the system further includes one or more module mounting brackets, each module mounting bracket configured to releasably retain a module mounted therein, and wherein each module mounting bracket includes a mounting section for mounting the module mounting bracket to a surface and a housing retention section for releaseably retaining a module mounted therein.

17. The system of claim 1, wherein the indicia is expressed as an integer number, such that each power module is marked with the integer number indicating an amount of power provided by the module, and each output module is marked with the integer number indicating an amount of power consumed by the module.

18. The system of claim 1, wherein the indicia are color-coded to identify whether the module provides power to the system or draws power from the system, to permit a user to balance available power as output by power modules with required power as consumed by output modules, for a given interconnected set of modules.

\* \* \* \* \*